US007484660B2

(12) United States Patent
Tanase

(10) Patent No.: US 7,484,660 B2
(45) Date of Patent: Feb. 3, 2009

(54) PRODUCT PURCHASE SUPPORT APPARATUS, PRODUCT PURCHASE SUPPORT METHOD, PRODUCT PURCHASE SUPPORT PROGRAM, INFORMATION CREATING APPARATUS, INFORMATION CREATING METHOD, INFORMATION CREATING PROGRAM, AND PRIVILEGE GRANTING SYSTEM

(75) Inventor: Rento Tanase, Shizuoka-ken (JP)

(73) Assignee: Yamaha Corporation, Hamamatsu-shi (JP)

( * ) Notice: Subject to any disclaimer, the term of this patent is extended or adjusted under 35 U.S.C. 154(b) by 337 days.

(21) Appl. No.: 11/017,549

(22) Filed: Dec. 20, 2004

(65) Prior Publication Data

US 2005/0133595 A1 Jun. 23, 2005

(30) Foreign Application Priority Data

Dec. 18, 2003 (JP) .............................. 2003-421088

(51) Int. Cl.
*G06K 15/00* (2006.01)
(52) U.S. Cl. ...................................... 235/383; 235/375
(58) Field of Classification Search ................. 235/375, 235/383, 380, 385
See application file for complete search history.

(56) References Cited

U.S. PATENT DOCUMENTS

| 5,310,997 A | * | 5/1994 | Roach et al. ................. 235/375 |
| 2002/0116209 A1 | | 8/2002 | Tsuge |

FOREIGN PATENT DOCUMENTS

| JP | 2002-133515 | 10/2000 |
| JP | 2001-195641 | 7/2001 |
| JP | 2002-056067 | 2/2002 |
| JP | 2002-056278 | 2/2002 |
| JP | 2002-190065 | 7/2002 |

OTHER PUBLICATIONS

Japanese Patent Office, "Office Action", (Jul. 3, 2007).
Japanese Patent Office: Office Action for Application No. 2003-421088 (dated Sep. 27, 2007).

\* cited by examiner

*Primary Examiner*—Daniel St. Cyr
(74) *Attorney, Agent, or Firm*—Pillsbury Winthrop Shaw Pittman LLP

(57) ABSTRACT

A product purchase support apparatus which is capable of providing detailed information on a product in accordance with a preference and the like of each customer. Attribute information indicative of attributes of customers and including priority evaluation information indicative of priority evaluation items therein is stored. Detailed information on each of the products is also stored. The attribute information associated with a customer ID for identifying a customer and detailed information on a product associated with the bar code information for identifying product detailed information are identified. Information related to the priority evaluation information included in the identified attribute information is only extracted and processed using the priority evaluation information as retrieval keys from the identified detailed information on the product. The customer ID and the bar code information associated with the processed information are stored in association with each other and transmitted as product inquiry information.

12 Claims, 17 Drawing Sheets

FIG. 3

<CUSTOMER MANAGEMENT TABLE TA1>

| CUSTOMER ID | ATTRIBUTE INFORMATION ||||| PRIORITY EVALUATION INFORMATION ||||
|---|---|---|---|---|---|---|---|---|---|
| | BASIC INFORMATION |||| | FIRST PRIORITY EVALUATION ITEM | SECOND PRIORITY EVALUATION ITEM | ... | N-TH PRIORITY EVALUATION ITEM | SPECIAL NOTE |
| | NAME | SEX | AGE | ... | | | | | |
| ID-1 | TARO | MALE | 42 | ... | ENVIRONMENTAL INFLUENCE | | ... | PRICE | DIABETES |
| ID-2 | HANAKO | FEMALE | 23 | ... | HEALTH | | ... | ... | ALLERGIC (SOYBEANS) |
| ... | ... | ... | ... | ... | ... | ... | ... | ... | ... |

FIG. 4A

We accept registration.
Enter customer ID
and basic information below.

CUSTOMER ID ;
NAME ;
SEX ;
AGE ;
ADDRESS ;
FAMILY MAKEUP ;
⋮

FIG. 4B

Registration of customer ID
and basic information was accepted.
Next, arrange the following priority
evaluation items in order of your importance.
Then, fill in a special note,
if any, in special note field.

<PRIORITY EVALUATION ITEMS>
1. ENVIRONMENTAL INFLUENCE
2. HEALTH
3. PRICE
4. QUALITY
   ⋮

<SPECIAL NOTE FIELD>

FIG. 5

<PRODUCT MANAGEMENT TABLE TA2>

| BAR CODE INFORMATION | DETAILED INFORMATION PRODUCT NAME, PRODUCTION PLACE, MATERIALS, PRICE, WHETHER OR NOT ADDITIVES ARE USED, ENVIRONMENTAL CONSIDERATION, etc. |
|---|---|
| ... | ... |
| ... | ... |
| ... | ... |
| ⋮ | ⋮ |

FIG. 6A

<INQUIRED PRODUCT INFORMATION LIST R1>

| CUSTOMER ID | BAR CODE INFORMATION | | | | | | | |
|---|---|---|---|---|---|---|---|---|
| ID-1 | ⋮ | ⋮ | ⋮ | ⋯ | ⋮ | ⋮ | ⋮ | ⋯ |
| ID-2 | ⋮ | ⋮ | ⋮ | ⋯ | ⋮ | ⋮ | ⋮ | ⋯ |
| ⋯ | ⋯ | ⋯ | ⋯ | ⋯ | ⋯ | ⋯ | ⋯ | ⋯ |

FIG. 6B

<PURCHASED PRODUCT INFORMATION LIST R2>

| CUSTOMER ID | BAR CODE INFORMATION | | | | | | | |
|---|---|---|---|---|---|---|---|---|
| ID-1 | ⋮ | ⋮ | ⋮ | ⋯ | ⋮ | ⋮ | ⋮ | ⋯ |
| ID-2 | ⋮ | ⋮ | ⋮ | ⋯ | ⋮ | ⋮ | ⋮ | ⋯ |
| ⋯ | ⋯ | ⋯ | ⋯ | ⋯ | ⋯ | ⋯ | ⋯ | ⋯ |

FIG. 6C

<UNPURCHASED PRODUCT INFORMATION LIST R3>

| CUSTOMER ID | BAR CODE INFORMATION | | | | | | | |
|---|---|---|---|---|---|---|---|---|
| ID-1 | ⋮ | ⋮ | ⋮ | ⋯ | ⋮ | ⋮ | ⋮ | ⋯ |
| ID-2 | ⋮ | ⋮ | ⋮ | ⋯ | ⋮ | ⋮ | ⋮ | ⋯ |
| ⋯ | ⋯ | ⋯ | ⋯ | ⋯ | ⋯ | ⋯ | ⋯ | ⋯ |

FIG. 7A

<FIRST PRIVILEGE GRANTING SCORE CONVERSION TABLE TA3
(FOR PURCHASED PRODUCTS)>

| PRODUCT CATEGORY | BAR CODE INFORMATION (IN ORDER OF INCREASING HARMFUL INFLUENCE ON BODY etc.) | PRIVILEGE GRANTING SCORE |
|---|---|---|
| FOOD | ... | a1 |
| | ... | a2(<a1) |
| | ... | a3(<a2) |
| | ⋮ | ⋮ |
| ELECTRICAL APPLIANCE | ... | b1 |
| | ... | b2(<b1) |
| | ... | b3(<b2) |
| | ⋮ | ⋮ |
| ⋮ | ⋮ | ⋮ |

FIG. 7B

<SECOND PRIVILEGE GRANTING SCORE CONVERSION TABLE TA4
(FOR PURCHASED STOP PRODUCTS)>

| PRODUCT CATEGORY | BAR CODE INFORMATION (IN ORDER OF DECREASING HARMFUL INFLUENCE ON BODY etc.) | PRIVILEGE GRANTING SCORE |
|---|---|---|
| FOOD | ... | a1' |
| | ... | a2'(<a1') |
| | ... | a3'(<a2') |
| | ⋮ | ⋮ |
| ELECTRICAL APPLIANCE | ... | b1' |
| | ... | b2'(<b1') |
| | ... | b3'(<b2') |
| | ⋮ | ⋮ |
| ⋮ | ⋮ | ⋮ |

FIG. 8

<CUSTOMER'S SCORE MANAGEMENT TABLE TA5>

| CUSTOMER ID | CUMULATIVE SCORE | CUMULATIVE PECUNIARY SCORE |
|---|---|---|
| ID-1 | ○× POINTS | ○○ POINTS |
| ID-2 | ×□ POINTS | △× POINTS |
| ⋮ | ⋮ | ⋮ |

FIG. 9

Ms.A
Your cumulative score and cumulative pecuniary score are as follows (as of current month):

<CUMULATIVE SCORE>
·○×□ ··· POINTS

<CUMULATIVE PECUNIARY SCORE>
·△×□ ··· POINTS

FIG. 12A

PRODUCT NAME ; CD PLAYER
MANUFACTURER ; COMPANY C
ENVIRONMENTAL ; GRADE "C"
CONSIDERATION
ENERGY SAVING ; GRADE "C"
OTHER ; HARMFUL SUBSTANCE
 (CONTAINING LEAD)

FIG. 12B

PRODUCT NAME ; CD PLAYER
MANUFACTURER ; COMPANY D
ENVIRONMENTAL ; GRADE "A"
CONSIDERATION (MANUFACTURED IN FIRM UNDER
 ENVIRONMENT CONFORMING TO ISO)
ENERGY SAVING ; GRADE "A"
OTHER ; ECO-MARK PRODUCT

FIG. 14A

Ms.○×
Top five products in terms of consideration of "health" are as follows (as of □.×,○×):

Ms.○×
Products that can affect the "allergic (soybeans)" are as follows (as of □.×,○×):

· □× (INGREDIENTS:×···)
· ×○ (INGREDIENTS:□···)
· □△ (INGREDIENTS:×···)
· ○○ (INGREDIENTS:○···)

PRODUCT PURCHASE SUPPORT APPARATUS, PRODUCT PURCHASE SUPPORT METHOD, PRODUCT PURCHASE SUPPORT PROGRAM, INFORMATION CREATING APPARATUS, INFORMATION CREATING METHOD, INFORMATION CREATING PROGRAM, AND PRIVILEGE GRANTING SYSTEM

BACKGROUND OF THE INVENTION

1. Field of the Invention

The present invention relates to a product purchase support apparatus and a product purchase support method for supporting customers in making a decision to purchase commodity products in a store or the like, and a product purchase support program, an information creating apparatus, an information creating method, and an information creating program, as well as to a privilege granting system.

2. Description of the Related Art

Product information provided for customers in supermarkets, convenience stores, and the like is limited to information written on product packages (i.e. product names and the like) and information written on panels or the like attached to product display racks. Therefore, customers may strongly desire to get more detailed information on products.

To meet the desire of customers, there has been proposed a system in which a database server storing detailed information on products (in the case of vegetables, production places, producers, agricultural chemicals in use, how to cook, etc. of vegetables, for example; hereinafter referred to as "detailed information") is set up on the Internet, and in response to a request from a customer's portable information terminal device, the database server sends detailed information on a product to the customer (see e.g. Japanese Laid-Open Patent Publication (Kokai) No. 2002-56278).The detailed information sent from the database server is displayed e.g. on a liquid crystal panel of the information terminal device. The customer can examine the product by referring to the detailed information displayed on the liquid crystal panel, and then determine whether or not the product should be purchased.

In the above-described system, when the detailed information on the same product is requested by any portable information terminal device (i.e. any customer), the detailed information of the same contents is sent from the database server. In actuality, however, information which customers really desire to obtain differs depending on the preferences of customers, environments where the customers live, and so forth. For example, in determining whether to purchase an electrical appliance "a", a customer A may attach importance to the influence that the use of the electrical appliance "a" exerts on the environment, while a customer B may attach importance to the design of the same. In spite of the fact that the importance attached to a product by customers when they consider the purchase thereof varies as described above, if the same detailed information is uniformly given to the customers, some customers cannot obtain information that meets their needs.

Further, in the above-described system, the database server only unilaterally gives detailed information on products in response to customers' requests, and therefore it is impossible to clearly understand what influence the detailed information exerts on the customers' decision on the purchase.

SUMMARY OF THE INVENTION

It is a first object of the present invention to provide a product purchase support apparatus, a product purchase support method, and a product purchase support program which are capable of providing detailed information on a product in accordance with a preference and the like of each customer.

It is a second object of the present invention to provide an information creating apparatus, an information creating method, an information creating program, and a privilege granting system which are capable of grasping the influence of detailed information on products upon customers' decision on the purchase.

To attain the above first object, in a first aspect of the present invention, there is provided a product purchase support apparatus connected to at least one customer terminal device, comprising a first database that stores attribute information indicative of attributes of a plurality of customers, on a customer-by-customer basis, a second database that stores detailed information on each of a plurality of products, a receiving device that receives customer identification information for identifying a customer, and product identification information for identifying a product detailed information on which is requested by the customer terminal device, from the customer terminal device, a first identification device that identifies attribute information on the customer associated with the customer identification information from the attribute information on the customers stored in the first database, a second identification device that identifies detailed information on the product associated with the product identification information from the detailed information on the products stored in the second database, an extracting and processing device that extracts information related to the attribute information identified by the first identification device from the detailed information on the product identified by the second identification device, and processes the extracted information, and a transmitting device that transmits the processed information as original detailed information to the customer terminal device.

With the arrangement of the product purchase support apparatus according to the first aspect of the invention, when detailed information on a product is requested from the customer terminal device, the product purchase support apparatus identifies attribute information indicative of attributes of a customer who has requested the detailed information, and extracts information related to the attribute information from the detailed information to process the extracted information as appropriate, followed by sending the processed information to the customer terminal device. The information thus sent to the customer terminal device is not the whole detailed information on the product, but original detailed information specific to the customer, which is created by extracting pieces of information from the whole detailed information on the product and processing the extracted pieces of information, in accordance with the attributes of the customer who has requested the detailed information. Therefore, each customer can purchase a product that suits his/her preference, by referring to the original detailed information sent from the product purchase support apparatus to the customer terminal device.

Preferably, the attribute information contains priority evaluation information indicative of at least one item given a higher priority in evaluation of a product by each customer when the customer purchases the product, and the extracting and processing device extracts information related to the priority evaluation information contained in the attribute information identified by the first identification device from the detailed information on the product identified by the second identification device, and processes the extracted information.

Preferably, the attribute information contains basic information indicative of at least one of a customer's sex, and age, and the extracting and processing device extracts information related to the basic information contained in the attribute information identified by the first identification device from the detailed information on the product identified by the second identification device, and processes the extracted information.

To attain the above first object, in a second aspect of the present invention, there is provided a product purchase support apparatus connected to at least one customer terminal device, comprising a first database that stores attribute information indicative of attributes of a plurality of customers, on a customer-by-customer basis, a second database that stores detailed information on each of a plurality of products, a receiving device that receives customer identification information for identifying a customer from the customer terminal device, an identification device that identifies attribute information on the customer associated with the customer identification information from the attribute information on the customers stored in the first database, an extracting and processing device that extracts detailed information on a product matching the attribute information on the customer identified by the identification device from the second database, and processes the extracted information, and a transmitting device that transmits the processed information as original detailed information to the customer terminal device.

To attain the above second object, in a third aspect of the present invention, there is provided an information creating apparatus connected to a product purchase support apparatus that transmits detailed information on each product requested by at least one customer terminal device to the customer terminal device, and an accounting apparatus that performs accounting operations on purchased products, comprising a first receiving device that receives product inquiry information indicative of at least one product associated with the detailed information transmitted to the customer terminal device, from the product purchase support apparatus, a second receiving device that receives purchased product information indicative of at least one product actually purchased by a customer from the accounting apparatus, and a creation device that creates, based on the product inquiry information and the purchased product information, unpurchased product information indicative of at least one product which was not purchased in actuality although a request for detailed information thereon had been made to the product purchase support apparatus from the customer terminal device.

With the arrangement of the information creating apparatus according to the third aspect of the present invention, product inquiry information associated with detailed information sent to the customer terminal device is received from the product purchase support apparatus, while purchased product information indicative of at least one product actually purchased by a customer is received from the accounting apparatus. Based on the received information, at least one unpurchased product which was not purchased although detailed information on the products was requested is identified and analyzed. Therefore, it is possible to clearly know what is valued or not valued by each customer when the customer purchases a product (e.g. a fact that a product was not purchased despite its attractive package because the product was produced without any consideration of the environment, or a fact that a product was not purchased because it contained a large amount of additives), and to grasp the influence of the detailed information on the product upon each customer's purchase decision. Further, this makes it possible to set a clear future course of product development.

Preferably, the information creating apparatus further comprises a storage device that stores the detailed information on each product, and at extracting device that searches the storage device using the unpurchased product information as a retrieval key, to thereby extract detailed information on the unpurchased product.

To attain the above second object, in a fourth aspect of the present invention, there is provided an information creating apparatus connected to a product purchase support apparatus that transmits detailed information on each product requested by at least one customer terminal device to the customer terminal device, and an accounting apparatus that performs accounting operations on purchased products, comprising a first receiving device that receives product inquiry information indicative of at least one product associated with the detailed information transmitted to the customer terminal device, and customer identification information for identifying a customer carrying the customer terminal device, from the product purchase support apparatus, a second receiving device that receives purchased product information indicative of at least one product actually purchased by the customer carrying the customer terminal device, and customer identification information for identifying the customer carrying the customer terminal device, from the accounting apparatus, and a creation device that creates, based on information received by the first and second receiving devices, unpurchased product information indicative of at least one unpurchased product which was not purchased in actuality although a request for detailed information thereon had been made to the product purchase support apparatus from the customer terminal device.

To attain the above second object, in a fifth aspect of the present invention, there is provided a privilege granting system including an information creating apparatus connected to a product purchase support apparatus that transmits detailed information on each product requested by at least one customer terminal device to the customer terminal device, and an accounting apparatus that performs accounting operations on purchased products, and a privilege granting apparatus connected to the information creating apparatus, wherein the information creating apparatus comprises a first receiving device that receives product inquiry information indicative of at least one product associated with the detailed information transmitted to the customer terminal device, and customer identification information for identifying a customer carrying the customer terminal device, from the product purchase support apparatus, a second receiving device that receives purchased product information indicative of at least one product actually purchased by the customer carrying the customer terminal device, and customer identification information for identifying the customer carrying the customer terminal device, from the accounting apparatus, and a creation device that creates, based on information received by the first and second receiving devices, unpurchased product information indicative of at least one unpurchased product which was not purchased in actuality although a request for detailed information thereon had been made to the product purchase support apparatus from the customer terminal device, and wherein the privilege granting server comprises a first storage device that stores pieces of identification information and respective cumulative scores in association with each other, on a customer-by-customer basis, a second storage device that stores unpurchased products and points to be given in association with each other, a receiving device that receives the unpurchased product information from the information processing apparatus, an identification device that searches the first storage device using the identification information on the customer added to the received unpurchased product information, as retrieval keys, to thereby identify a customer to be given points, a calculating device that searches the second storage device using the unpurchased product indicated by the unpurchased product information, as a retrieval key, to thereby calculate points to be given; and an updating device that updates a cumulative score associated with the customer identified by the identification device, according to the calculated points.

With the configuration of the privilege granting system according to the fifth aspect of the present invention, it is possible to grasp the influence of detailed information on a product upon each customer's purchase decision. Further, each customer can refer to his/her cumulative score and grasp what privilege is granted in return for attention paid to the health or the environment when purchasing a product.

To attain the above first object, in a sixth aspect of the present invention, there is provided a product purchase support method for a product purchase support apparatus that is connected to at least one customer terminal device and includes a first database, and a second database, comprising a first storage step of storing attribute information indicative of attributes of a plurality of customers, on a customer-by-customer basis, in the first database, a second storage step of storing detailed information on each of a plurality of products in the second database, a receiving step of receiving customer identification information for identifying a customer, and product identification information for identifying a product detailed information on which is requested by the customer terminal device, from the customer terminal device, a first identification step of identifying attribute information on the customer associated with the customer identification information from the attribute information on the customers stored in the first database, a second identification step of identifying detailed information on the product associated with the product identification information from the detailed information on the products stored in the second database, an extracting and processing step of extracting information related to the attribute information identified in the first identification step from the detailed information on the product identified in the second identification step, and processing the extracted information, and a transmitting step of transmitting the processed information as original detailed information to the customer terminal device.

To attain the above first object, in a seventh aspect of the present invention, there is provided a product purchase support method for a product purchase support apparatus that is connected to at least one customer terminal device and includes a first database, and a second database, comprising a first storage step of storing attribute information indicative of attributes of a plurality of customers, on a customer-by-customer basis, in the first database, a second storage step of storing detailed information on each of a plurality of products in the second database, a receiving step of receiving customer identification information for identifying a customer from the customer terminal device, an identification step of identifying attribute information on the customer associated with the customer identification information from the attribute information on the customers stored in the first database, an extracting and processing step of extracting detailed information on a product matching the attribute information on the customer identified in the identification step from the second database, and processing the extracted information, and a transmitting step of transmitting the processed information as original detailed information to the customer terminal device.

To attain the above second object, in an eighth aspect of the present invention, there is provided a information creating method for an information creating apparatus connected to a product purchase support apparatus that transmits detailed information on each product requested by at least one customer terminal device to the customer terminal device, and an accounting apparatus that performs accounting operations on purchased products, comprising a first receiving step of receiving product inquiry information indicative of at least one product associated with the detailed information transmitted to the customer terminal device, from the product purchase support apparatus, a second receiving step of receiving purchased product information indicative of at least one product actually purchased by a customer from the accounting apparatus, and a creation step of generating, based on the product inquiry information and the purchased product information, unpurchased product information indicative of at least one unpurchased product which was not purchased in actuality although a request for detailed information thereon had been made to the product purchase support apparatus from the customer terminal device.

To attain the above second object, in a ninth aspect of the present invention, there is provided an information creating method for an information creating apparatus connected to a product purchase support apparatus that transmits detailed information on each product requested by at least one customer terminal device to the customer terminal device, and an accounting apparatus that performs accounting operations on purchased products, comprising a first receiving step of receiving product inquiry information indicative of at least one product associated with the detailed information transmitted to the customer terminal device, and customer identification information for identifying a customer carrying the customer terminal device, from the product purchase support apparatus, a second receiving step of receiving purchased product information indicative of at least one product actually purchased by the customer carrying the customer terminal device, and customer identification information for identifying the customer carrying the customer terminal device, from the accounting apparatus, and a creation step of generating, based on information received in the first and second receiving steps, unpurchased product information indicative of at least one unpurchased product which was not purchased in actuality although a request for detailed information thereon had been made to the product purchase support apparatus from the customer terminal device.

To attain the above first object, in a tenth aspect of the present invention, there is provided a computer-readable product purchase support program applied to a product purchase support apparatus that is connected to at least one customer terminal device and includes a first database, and a second database, comprising a first storage module for storing attribute information indicative of attributes of a plurality of customers, on a customer-by-customer basis, in the first database, a second storage module for storing detailed information on each of a plurality of products in the second database, a receiving module for receiving customer identification information for identifying a customer, and product identification information for identifying a product detailed information on which is requested by the customer terminal device, from the customer terminal device, a first identification module for identifying attribute information on the customer associated with the customer identification information from the attribute information on the customers stored in the first database, a second identification module for identifying detailed information on the product associated with the product identification information from the detailed information on the products stored in the second database, an extracting and processing module for extracting information related to the attribute information identified by the first identification module from the detailed information on the product identified by the second identification module, and processing the extracted information, and a transmitting module for transmitting the processed information as original detailed information to the customer terminal device.

To attain the above first object, in an eleventh aspect of the present invention, there is provided a computer-readable product purchase support program applied to a product purchase support apparatus that is connected to at least one customer terminal device and includes a first database, and a second database, comprising a first storage module for storing attribute information indicative of attributes of a plurality of customers, on a customer-by-customer basis, in the first database, a second storage module for storing detailed information on each of a plurality of products in the second database, a receiving module for receiving customer identification information for identifying a customer from the customer terminal device, an identification module for identifying attribute information on the customer associated with the customer identification information from the attribute information on the customers stored in the first database, an extracting and processing module for extracting detailed information on a product matching the attribute information on the customer identified by the identification module from the second database, and processing the extracted information, and a transmitting module for transmitting the processed information as original detailed information to the customer terminal device.

To attain the above second object, in a twelfth aspect of the present invention, there is provided a computer-readable information creating program applied to an information creating apparatus connected to-a product purchase support apparatus that transmits detailed information on each product requested by at least one customer terminal device to the customer terminal device, and an accounting apparatus that performs accounting operations on purchased products, comprising a first receiving module for receiving product inquiry information indicative of at least one product associated with the detailed information transmitted to the customer terminal device, from the product purchase support apparatus, a second receiving module for receiving purchased product information indicative of at least one product actually purchased by customers from the accounting apparatus, and a creation module for creating, based on the product inquiry information and the purchased product information, unpurchased product information indicative of at least one unpurchased product which was not purchased in actuality although a request for detailed information thereon had been made to the product purchase support apparatus from the customer terminal device.

To attain the above second object, in a thirteenth aspect of the present invention, there is provided a computer-readable information creating program applied to an information creating apparatus connected to a product purchase support apparatus that transmits detailed information on each product requested by at least one customer terminal device to the customer terminal device, and an accounting apparatus that performs accounting operations on purchased products, comprising a first receiving module for receiving product inquiry information indicative of at least one product associated with the detailed information transmitted to the customer terminal device, and customer identification information for identifying a customer carrying the customer terminal device, from the product purchase support apparatus, a second receiving module for receiving purchased product information indicative of at least one product actually purchased by the customer carrying the customer terminal device, and customer identification information for identifying the customer carrying the customer terminal device, from the accounting apparatus, and a creation module for creating, based on information received by the first and second receiving modules, unpurchased product information indicative of at least one unpurchased product which was not purchased in actuality although a request for detailed information thereon had been made to the product purchase support apparatus from the customer terminal device.

The above and other objects, features, and advantages of the invention will become more apparent from the following detailed description taken in conjunction with the accompanying drawings.

BRIEF DESCRIPTION OF THE DRAWINGS

FIG. 3 is a diagram showing an example of a customer management table TA1;

FIG. 4A is a view showing an example of a message displayed on a display section of a user PC for entry of basic information in the customer management table TA1;

FIG. 4B is a view showing an example of a message displayed on the display section of the user PC for entry of priority evaluation information in the customer management table TA1;

FIG. 5 is a diagram showing an example of a product management table TA2;

FIG. 6A is a diagram showing an example of an inquired product information list R1 stored in a memory 431;

FIG. 6B is a diagram showing an example of a purchased product information list R2 stored in a memory 432;

FIG. 6C is a diagram showing an example of an unpurchased product information list R3 stored in a memory 433;

FIG. 7A is a diagram showing an example of registered contents of a first privilege granting score conversion table TA3 stored in a privilege granting database 530;

FIG. 7B is a diagram showing an example of registered contents of a second privilege granting score conversion table TA4 stored in the privilege granting database 530;

FIG. 8 is a diagram showing an example of a customer point management table stored in a privilege score storage database;

FIG. 9 is a view showing an example of a screen displayed on the user PC;

FIG. 12A is a view showing an example of a screen displayed on a display device 250 when an inquiry about a product (electrical appliance) is made;

FIG. 12B is a view showing an example of another screen displayed on the display device 250 when an inquiry about another product (electrical appliance) is made;

FIG. 14A is a view showing an example of a screen displayed on a display device according to a variation 3;

FIG. 14B is a view showing an example of another screen displayed on the display device according to the variation 3;

FIGS. 17A to 17D show an example of graphs displayed on the display device according to the variation 4, in which:

FIG. 17A shows a graph of age groups concerning an unpurchased product;

FIG. 17B shows a graph of sexes concerning the unpurchased product;

FIG. 17C shows a graph of priority evaluation items concerning the unpurchased product; and FIG. 17D shows a graph of special notes concerning the unpurchased product.

DETAILED DESCRIPTION OF THE PREFERRED EMBODIMENTS

Figure 1A:
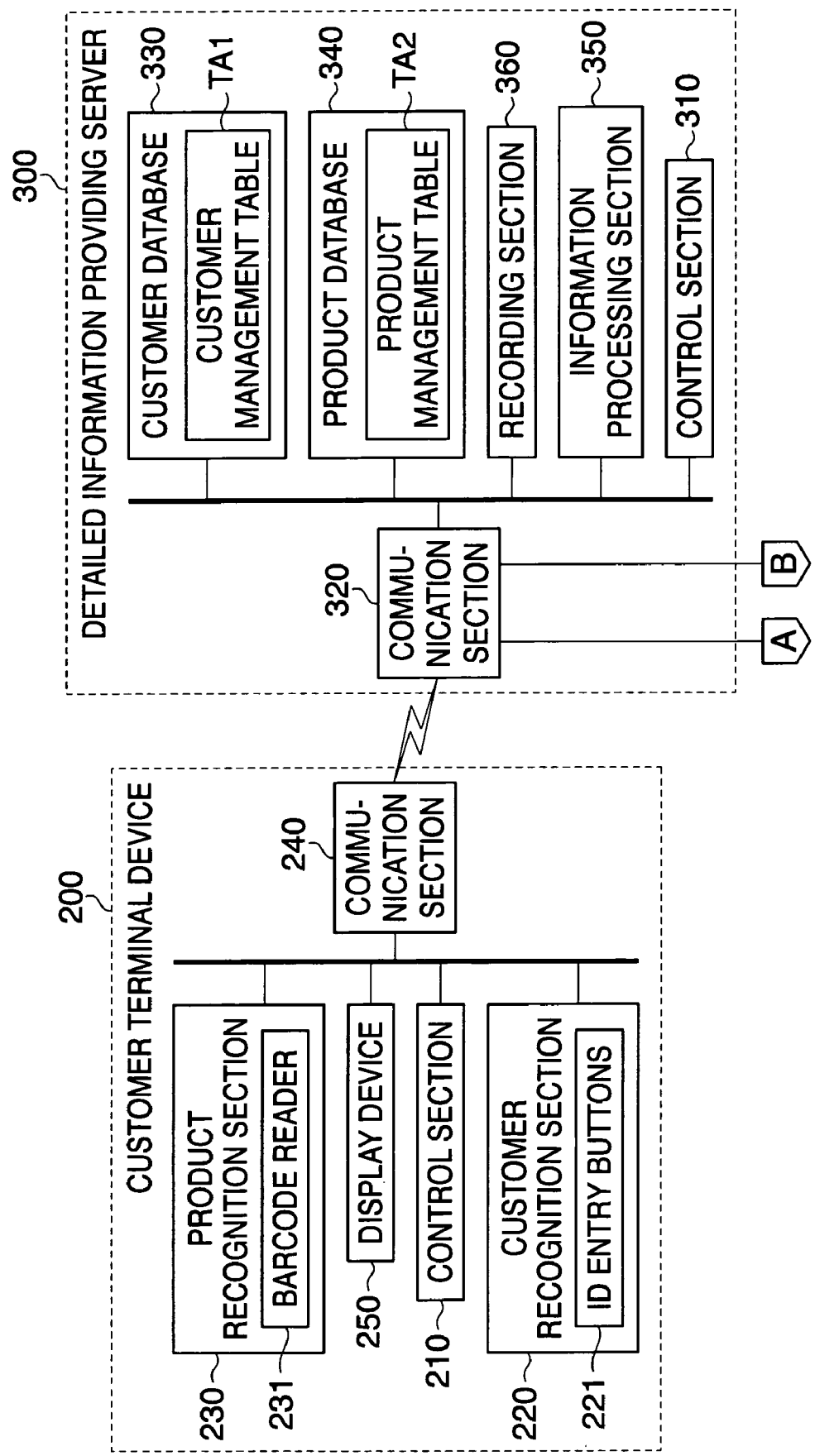
FIGS. 1A and 1B are diagram showing the configuration of a product purchase system including a product purchase support apparatus according to an embodiment of the present invention.

The present invention will now be described in detail with reference to the drawings showing a preferred embodiment thereof. In the drawings, elements and parts which are identical throughout the views are designated by identical reference numerals, and duplicate description thereof is omitted.

Figure 1B:
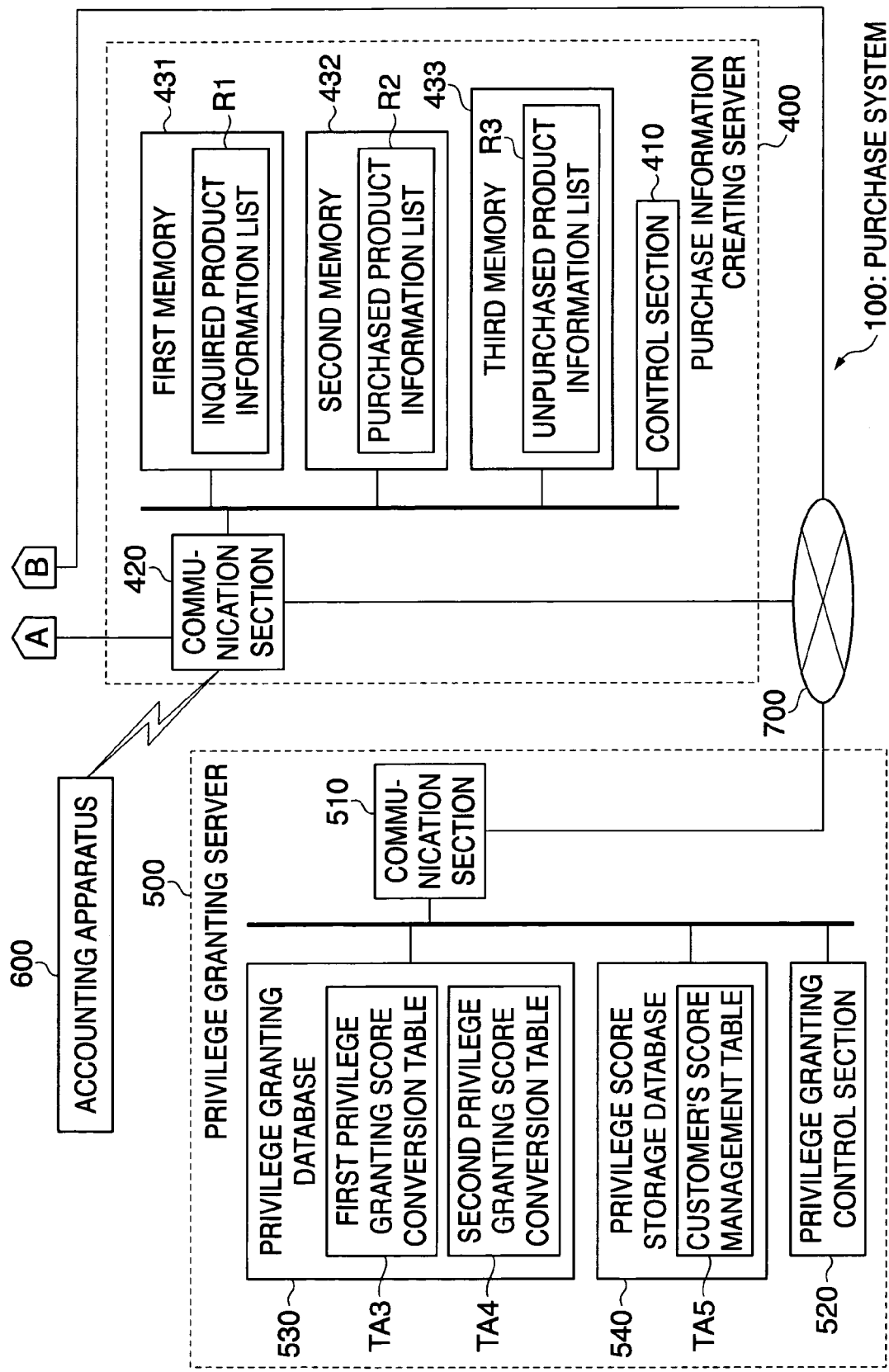

FIGS. 1A and 1B are diagram showing the configuration of a product purchase system including a product purchase support apparatus according to an embodiment of the present invention.

Figure 2:
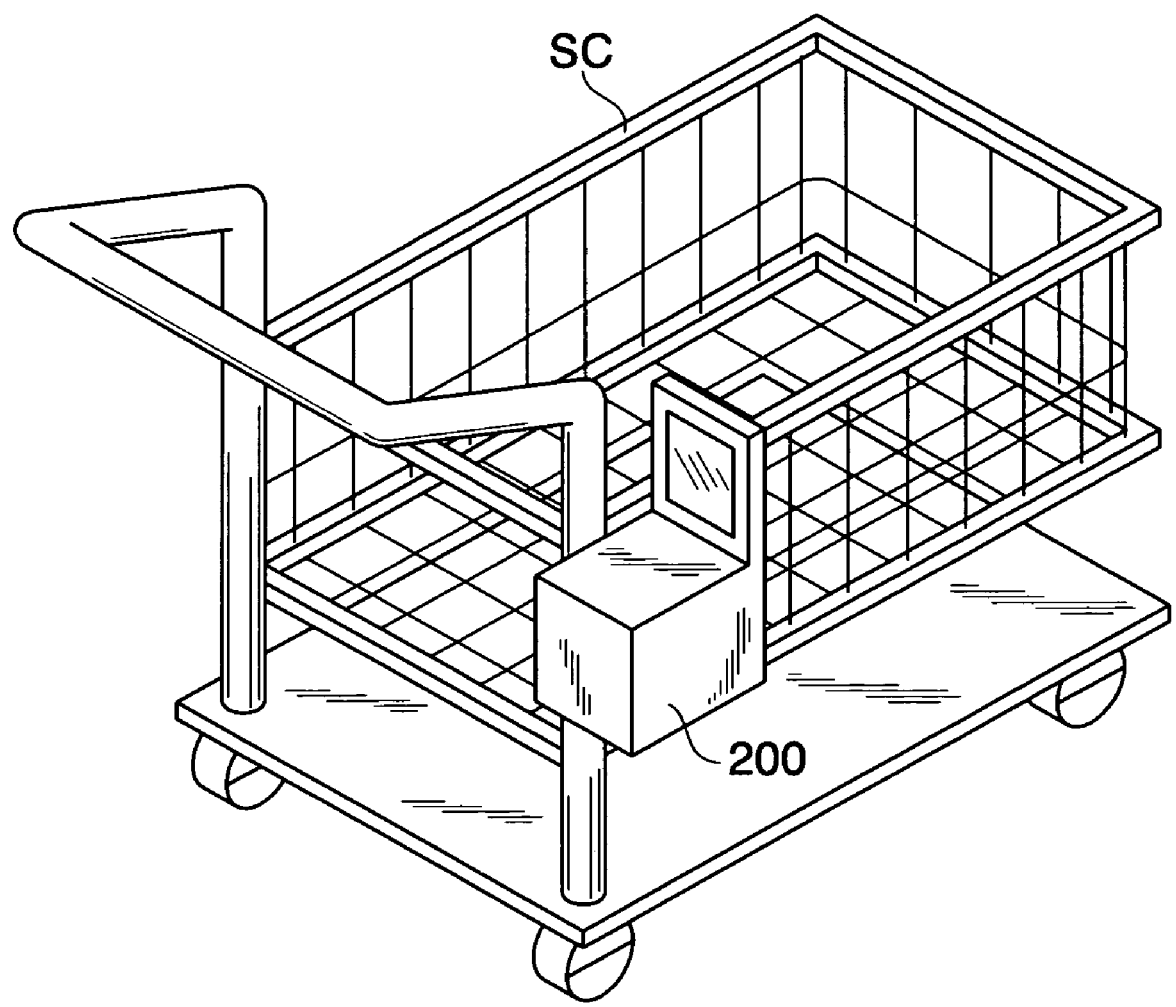
FIG. 2 is a perspective view showing the appearance of a shopping cart provided with a customer terminal device.

As shown in FIGS. 1A and 1B, the product purchase system 100 is comprised of a plurality of customer terminal devices 200 installed on respective shopping carts SC (see FIG. 2) in a store, a detailed information providing server 300 that processes detailed information on products requested by customers from the customer terminal devices 200 in accordance with preferences or the like of the customers and sends the processed detailed information to the customer terminal devices 200, a purchase information creating server 400 that creates e.g. information on whether or not products associated with the detailed information provided by the detailed information providing server 300 were purchased by customers, and a privilege granting server 500 that collects information created by the purchase information creating server 400 and grants various privileges to the customers based on the collected information. Although only one of the customer terminal devices 200 is shown in FIG. 1A to avoid complexity thereof, actually, each shopping cart (or each shopping basket) is provided with the customer terminal device 200.

The customer terminal device 200 in FIG. 1A is comprised of a control section 210, a customer recognition section 220, a product recognition section 230, a communication section 240, and a display device 250. The control section 210, the customer recognition section 220, the product recognition section 230, and the display device 250 are connected to the communication section 240.

The control section 210 includes a CPU, a ROM, and a RAM (none of which are shown), and executes various control programs stored in the ROM, to thereby perform centralized control of the overall operation of the customer terminal device 200.

The customer recognition section 220 includes ID entry buttons 221. The customer recognition section 220 recognizes a customer who is using the customer terminal device 200, based on a customer ID entered via the ID entry buttons 221 (as will be described in detail hereinafter).

The product recognition section 230 includes a bar code reader 231. On product display racks (not shown) in the store, there are displayed various kinds of products having bar codes affixed thereto as respective identification codes indicative of the names of the products. When receiving information read from a bar code (hereinafter referred to as "bar code information") from the bar code reader 231, the product recognition section 230 recognizes a product about which an inquiry has been made by a customer (i.e. a product detailed information on which has been requested), from the bar code information (as will be described in detail hereinafter).

The communication section 240 is provided with a wireless communication interface (IEEE 802.11b or the like). The communication section 240 sends a customer ID and bar code information supplied, respectively, from the customer recognition section 220 and the product recognition section 230 to the detailed information providing server 300, and receives detailed information from the detailed information providing server 300.

The display device 250, which is implemented e.g. by a liquid crystal panel, displays detailed information received by the communication section 240, a character message prompting a customer using the terminal device 200 to perform predetermined entry, and so forth.

The detailed information providing server 300 as the product purchase support apparatus is comprised of a control section 310, a communication section 320, a customer database 330, a product database 340, an information processing section 350, and a recording section 360. The control section 310, the customer database 330, the product database 340, the information processing section 350, and the recording section 360 are connected to the communication section 320.

The control section 310 includes a CPU, a ROM, and a RAM (none of which are shown), and executes various control programs stored in the ROM, to thereby perform centralized control of the overall operation of the detailed information providing server 300.

The communication section 320 is provided with a wireless communication interface and a wired communication interface. The communication section 320 is connected to the customer terminal devices 200 by wireless communication and to the purchase information creating server 400 and so forth by wireless or wired communication, for sending and receiving various kinds of data to and from the customer terminal devices 200 and the purchase information creating server 400 and so forth.

The customer database 330 stores a customer management table TA1 for managing customers utilizing the product purchase system 100 for the purchase of products. FIG. 3 is a diagram showing an example of the customer management table TA1.

As shown in FIG. 3, in the customer management table TA1, there is registered attribute information indicative of each customer's attributes (preferences, environment, etc.) on a customer-by-customer basis. This attribute information consists of a customer ID for identifying a customer, the customer's basic information including a name, sex, an age, an address, a family makeup, etc., priority evaluation information including first to n-th priority evaluation items arranged in order of priority which the customer gives in evaluation of a product to be purchased, and a special note specific to the customer.

Registration of attribute information in the customer management table TA1 is performed, for example, as follows: First, a customer accesses the detailed information providing server 300 using his/her own personal computer or the like (hereinafter referred to as "the user PC"), and requests registration of attribute information in the customer management table TA1. When receiving the registration request, the control section 310 of the detailed information providing server 300 sends to the user PC a message prompting the customer to enter his/her customer ID and basic information. FIG. 4A is a view showing an example of the message displayed on a display section of the user PC, for entry of the customer's basic information in the customer management table TA1.

The customer sequentially enters his/her unique customer ID (e.g. ID-1), name (e.g. TARO . . . ), sex (e.g. male), age (e.g. 42), etc., following the message displayed on the display section of the user PC. When the operation is completed, the customer ID and the basic information are sent from the user PC to the detailed information providing server 300. When receiving the customer ID and the basic information, the control section 310 of the detailed information providing server 300 sends to the user PC a message prompting the customer to enter priority evaluation information. FIG. 4B is a view showing an example of the message displayed on the display section of the user PC, for entry of the priority evaluation information in the customer management table TA1.

As shown in FIG. 4B, in an upper area of the display section, there are displayed optional priority evaluation items (environmental influence, health, quality, price, etc.) for selection, and in a lower area of the display-section, there is displayed a field for a special note. After having checked contents displayed on the display section, the customer optionally extracts items he/she regards as important, from the priority evaluation items displayed in the upper area, and arranges the extracted items in order of priority.

For example, if the customer is highly conscious of environmental problems, the "environmental influence" is selected as the first priority evaluation item, . . . , and the "price" is selected as the n-th priority evaluation item (see FIG. 3). On the other hand, if the customer is particular about the health alone, and does not care about anything else (price, design, etc.), the "health" is selected as the first priority evaluation item, and no other items are selected (see FIG. 3). The customer thus optionally selects one or more priority evaluation items, and then writes a special note in the special note field displayed in the lower area of the display section.

For example, if the customer (including his or her family members) is a person on medication for a disease such as diabetes, he/she writes the name of the disease, the name of a medicine, and so forth, in the special note field. On the other hand, if the customer is allergic, he/she writes the names of substances that aggravate the symptom in the special note field. When all the entries have been made, the priority evaluation information is sent to the detailed information providing server 300 from the user PC. When receiving the priority evaluation information, the control section 310 of the detailed information providing server 300 registers the same in the customer management table TA1 together with the above-mentioned customer ID and basic information (see FIG. 3), followed by terminating the process.

Referring again to FIGS. 1A and 1B, the product database 340 stores a product management table TA2 for managing products (including services) provided by the store. FIG. 5 is a diagram showing an example of the product management table TA2. As shown in FIG. 5, in the product management table TA2, there are registered bar code information for identifying products, and detailed information containing pieces of information indicative of a product name, a production place, materials, a price, uses, effects, whether or not additives are used, environmental consideration, etc. in association with each product.

When detailed information is requested from the customer terminal device 200, the information processing section 350 extracts information related to attribute information (see FIG. 3) of the customer from various kinds of information contained in the detailed information, and processes the extracted information to thereby create original detailed information specific to the customer (as will be described in detail hereinafter).

When the original detailed information is provided in response to the request from the customer, the recording section 360 records a customer ID for identifying the customer and bar code information on a product associated with the provided original detailed information, in association with each other. The control section 310 sends the customer ID and the bar code information recorded in the recording section 360 to the purchase information creating server 400, as product inquiry information.

An accounting apparatus 600 appearing in FIG. 1B is implemented by a POS system for recording and totalizing information associated with products actually purchased by customers. Whenever a product is purchased, the accounting apparatus 600 records a customer ID for identifying a customer who purchased the product and bar code information on the product in a memory, not shown, in association with each other. The accounting apparatus 600 sends the customer ID and the bar code information as purchased product information to the purchase information creating server 400.

The purchase information creating server 400 is comprised of a control section 410, a communication section 420, a first memory 431, a second memory 432, and a third memory 433. The control section 410, the first memory 431, the second memory 432, and the third memory 433 are connected to the communication section 420.

The control section 410 includes a CPU, a ROM, and a RAM (none of which are shown), and executes various control programs stored in the ROM, to thereby perform centralized control of the overall operation of the purchase information creating server 400.

The communication section 420 is provided with a wireless communication interface and a wired communication interface for sending and receiving various kinds of data to and from the detailed information providing server 300 and the accounting apparatus 600. More specifically, the communication section 420 requests the product inquiry information from the detailed information providing server 300, and receives the product inquiry information sent in response to the request. Further, the communication section 420 is connected to the accounting apparatus 600 by wireless or wired communication to request the purchased product information from the accounting apparatus 600 and receive the purchased product information sent in response to the request.

The product inquiry information and the purchased product information may be automatically transmitted without the purchase information creating server 400 issuing requests to the detailed information providing server 300 and the accounting apparatus 600, whenever the detailed information providing server 300 provides original detailed information for a customer terminal device 200 (i.e. whenever an inquiry about a product is made) or whenever the accounting apparatus 600 performs an accounting operation.

The first memory 431, the second memory 432, and the third memory 433 store the product inquiry information, the purchased product information, and unpurchased product information, respectively, in a list form. The unpurchased product information is indicative of products which were not purchased in actuality although inquiries about the products were made (hereinafter referred to as "unpurchased product(s)"). This information consists of customer IDs for identifying customers who made inquires about products and bar code information on the products.

FIG. 6A is a diagram showing an example of an inquired product information list R1 stored in the memory 431. FIG.

6B is a diagram showing an example of a purchased product information list R2 stored in the memory 432. FIG. 6C is a diagram showing an example of an unpurchased product information list R3 stored in the memory 433.

In the list R1, pieces of bar code information for identifying respective products about which inquiries were made are registered on a customer-by-customer basis. In the list R2, pieces of bar code information for identifying respective products which were actually purchased are registered on a customer-by-customer basis. In the list R3, pieces of bar code information for identifying respective unpurchased products are registered on a customer-by-customer basis. Now, a description will be given of operations for registering information in the respective lists. R1, R2, and R3. First, when receiving product inquiry information from the detailed information providing server 300, the control section 410 determines, by referring to a customer ID contained in the product inquiry information, a location in the inquired product information list R1 where the received product inquiry information should be registered, and registers associated bar code information at the determined location in the list R1.

Similarly, when receiving purchased product information from the accounting section 600, the control section 410 determines, by referring to a customer ID contained in the purchased product information, a location in the purchased product information list R2 where the received purchased product information should be registered, and registers associated bar code information at the determined location in the list R2.

Further, the control section 410 performs comparison between the inquired product information list R1 and the purchased product information list R2 to identify unpurchased products. More specifically, when a product registered in the inquired product information list R1 is not registered in the purchased product information list R2, the control section 410 regards the product as an unpurchased product, and extracts bar code information on the unpurchased product and a customer ID associated therewith.

Then, the control section 410 determines, by referring to the extracted customer ID, a location in the unpurchased product information list R3 where the bar code information should be registered, and registers the bar code information at the determined location in the list R3. The control section 410 repeatedly carries out the operations at predetermined time intervals (e.g. every one hour) until the lapse of a preset time period (e.g. 24 hours) is detected, and then the control section 410 reads out the purchased product information list R2 and the unpurchased product information list R3 from the second memory 432 and the third memory 433, respectively, and sends these to the privilege granting server 500. After having sent the lists R2 and R3, the control section 410 erases the contents registered in the lists, for a subsequent restart of the above described operations.

The privilege granting server 500 is comprised of a communication section 510, a privilege granting control section 520, a privilege granting database 530, and a privilege score storage database 540. The privilege granting control section 520, the privilege granting database 530, and the privilege score storage database 540 are connected to the communication section 510.

The communication section 510 is provided with various communication interfaces. The communication section 510 is connected to the communication section 320 and the communication section 420 via a communication network 700, for sending and receiving various kinds of data to and from the detailed information providing server 300 and the purchase information creating server 400 via the communication network 700.

The privilege granting control section 520 includes a CPU, a ROM, and a RAM (none of which are shown), and performs centralized control of the overall operation of the privilege granting server 500. When receiving the purchased product information list R2 and the unpurchased product information list R3 from the control section 510, the privilege granting control section 520 converts privilege scores by referring to the privilege granting database 530 and registers the converted privilege scores in the privilege score storage database 540.

FIG. 7A is a diagram showing an example of contents registered in a first privilege granting score conversion table TA3 stored in the privilege granting database 530, while FIG. 7B is a diagram showing an example of contents registered in a second privilege granting score conversion table TA4 stored in the privilege granting database 530.

The first privilege granting score conversion table TA3 shown in FIG. 7A is for products actually purchased by customers, while the second privilege granting score conversion table TA4 shown in FIG. 7B is for unpurchased products. In each of the score conversion tables TA3 and TA4, categories of products (food, electrical appliances, etc.) to be given points, i.e. scores, bar codes of the respective products, and privilege granting scores are registered in association with each other.

More specifically, in a bar code information registration of the first privilege granting score conversion table TA3, products (bar codes) having harmful influence on the human body or the environment (hereinafter referred to as "harmful influence on the body etc.") are registered in order of increasing influence on a category-by-category basis. In a privilege granting score registration column, there are registered privilege granting scores which are set such that the less harmful influence on the human body etc. a product has, the higher score is given to the product.

For example, the highest score a1 is set for a product having the least harmful influence on the human body etc. among products belonging to a product category "food" (i.e. a food product containing no additive or the like), and the second highest score a2 (<a1) is set for a product having the second least harmful influence on the human body etc. The other scores are set similarly, and hence the lowest score is set for a product having the most harmful influence on the human body etc.

On the other hand, in the second privilege granting score conversion table TA4, there are registered contents in completely reverse order to the contents in the first privilege granting score conversion table TA3. More specifically, in a bar code information registration column of the second privilege granting score conversion table TA4, products (bar codes) having harmful influence on the human body etc. are registered in order of decreasing influence on a category-by-category basis. In a privilege granting score registration column, there are registered privilege granting scores which are set such that the more harmful influence on the human body etc. a product has, the higher score is given to the product.

The use of the privilege granting score conversion tables TA3 and TA4 formed as above makes it possible to give a higher score to a customer who was more attentive to the health or the environment when purchasing a product. For example, if a customer purchases a product produced in consideration of the health or the environment even though the product is a little more expensive than other products, a higher score (e.g. a1 points) is given to the customer based on the first privilege granting score conversion table TA3.

On the other hand, if a customer who comes to know, by referring to detailed information obtained after making an inquiry about a product, that the product is less expensive than other products, but is produced without any consideration of the health or the, environment, stops the purchase of the product, a higher score (e.g. a1' points) is given to the customer based on the second privilege granting score conversion table TA4.

Although in the present embodiment, a privilege granting score is determined using the first privilege granting score conversion table TA3 or the second privilege granting score conversion table TA4, how to determine a privilege granting score can be changed as required, e.g. according to what privilege points should be given for.

Referring again to FIGS. 1A and 1B, the privilege granting control section 520 determines a privilege granting score by referring to the purchased product information list R2 and the unpurchased product information list R3 received from the purchase information creating server 400, and then registers the determined privilege granting score in a customer's score management table TA5 in the privilege score storage database 540.

FIG. 8 is a diagram showing an example of the customer's score management table TA5 stored in the privilege score storage database 540.

The customer's score management table TA5 shown in FIG. 8 is for managing a score storage state associated with each customer who utilizes the product purchase system 100. In the customer's score management table TA5, customer IDs for identifying respective customers, cumulative scores indicative of customer-by-customer points accumulated over a predetermined time period (e.g. one month), and cumulative pecuniary scores indicative of a cumulative sum of pecuniary points, i.e. a pecuniary score, to be given to each customer are registered in association with each other.

The privilege granting control section 520 determines privilege granting scores on a customer-by-customer basis as described above, and then adds each of the determined privilege granting scores to a cumulative score for an associated customer to thereby update the cumulative score. For example, when a privilege granting score determined as above in association with a customer assigned a customer ID "ID-1" is (a1+b3+a1') points, the privilege granting control section 520 adds the determined privilege granting score to an associated cumulative score to thereby update the same. At the same time, the privilege granting control section 520 calculates a pecuniary score e.g. by multiplying the cumulative score by a pecuniary score-calculating coefficient preset in a memory., not shown, and adds the calculated pecuniary score to an associated cumulative pecuniary score to thereby update the same.

The privilege granting control section 520 updates cumulative scores and cumulative pecuniary scores based on the purchased product information list R2 and the unpurchased product information list. R3 sequentially supplied from the purchase information creating server 400 over the predetermined time period (e.g. one month). Then, when the predetermined time period has elapsed, the privilege granting control section 520 erases the scores, and newly starts updating scores.

On the other hand, when each customer utilizing the product purchase system 100 wants to check his/her cumulative pecuniary score, he/she accesses the privilege granting server 500 using a user PC or the like.

When the customer sends an access request from the user PC, the privilege granting server 500 performs authentication using the customer ID contained in the access request. When the authentication is successful, the privilege granting sever 500 extracts a cumulative score and a cumulative pecuniary score associated with the customer from the customer's score management table TA5 (see FIG. 8) stored in the privilege score storage database 540, and sends the extracted scores to the user PC.

As a result, a screen an example of which is shown in FIG. 9 is displayed on the display section of the user PC. By viewing the screen displayed on the display section, the customer can grasp what privilege is granted in return for attention paid to the health or the environment when purchasing a product.

The product purchase system 100 according to the present embodiment is configured as described above.

Hereafter, the operation of the product purchase system 100 will be described according to three phases, i.e. a preparation phase, a product selection phase, and a product purchase phase.

<Preparation Phase>

Figure 10:
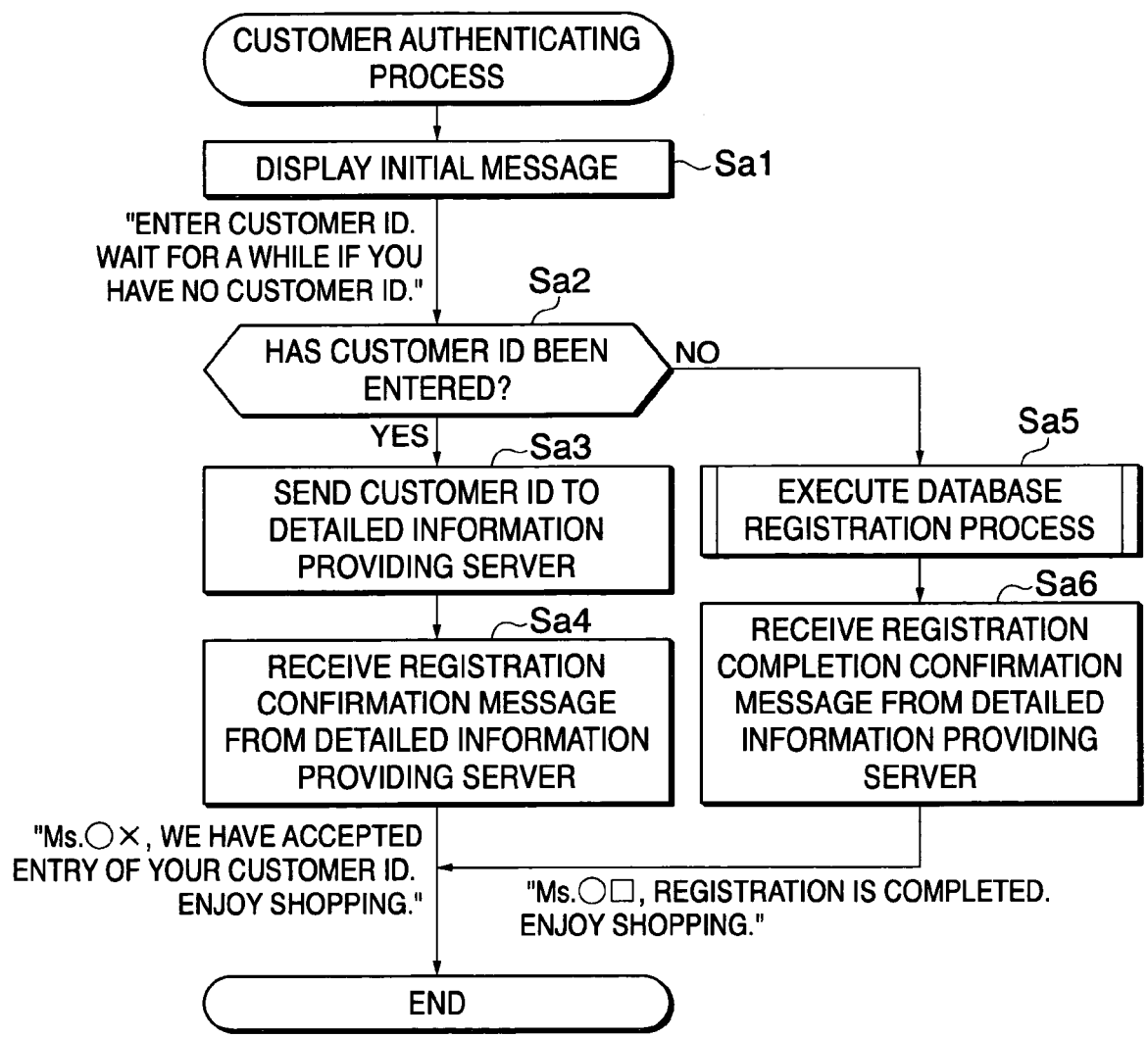
FIG. 10 is a flowchart of a customer authentication process.

When entering the store, a customer utilizing the product purchase system 100 pulls out a shopping cart SC (see FIG. 2) and turns on the power switch, not shown, of the customer terminal device 200 installed on the shopping cart SC. When the power switch is turned on, the control section 210 of the customer terminal device 200 starts a customer authenticating process shown in FIG. 10. First, the control section 210 causes the display device 250 to display an initial message saying "Enter your customer ID. If you don't have a customer ID, wait for a while in this state" (step Sa1). When the customer has utilized the product purchase system 100 before and is assigned a unique customer ID (e.g. "ID-1"), he/she uses the ID entry buttons 221 to enter the customer ID.

The control section 210 determines whether or not the customer ID has been entered within a predetermined time period (e.g. one minute) (step Sa2). If the customer ID has been entered, the control section 210 receives the customer ID via the customer recognition section 220, and sends the received customer ID to the detailed information providing server 300 via the communication section 240 (step Sa2→step Sa3). When receiving the customer ID from the customer terminal device 200, the control section 310 of the detailed information providing server 300 compares the customer ID with the customer IDs registered in the customer management table TA1 (see FIG. 3), and determines whether or not the customer is a registered customer. If the customer is a registered customer, the control section 310 sends to the customer terminal device 200 a confirmation message saying "Mr. (or Ms.) So-and-So, we have accepted your customer ID. Enjoy shopping". When receiving the confirmation message from the detailed information providing server 300 (step Sa4), the control section 210 of the customer terminal device 200 causes the display device 250 to display the message, followed by terminating the present process.

On the other hand, when it is detected in the step Sa2 that the predetermined time period (e.g. one minute) has elapsed without entry of a customer ID (NO to the step Sa2), the control section 210 of the customer terminal device 200 carries out registration of attribute information in the customer management table TA1 (i.e. database registration processing) (step Sa5). The database registration processing is similar to the processing for attribute information registration, described hereinbefore, except that the database registration processing is executed via a different terminal device (i.e.

using not a user PC, but a customer terminal device 200), and hence description thereof is omitted (see FIGS. 4A and 4B).

When having terminated the database registration processing and received from the detailed information providing server 300 a message saying "Mr. (or Ms.) So-and-So, registration is completed. Enjoy shopping" (step Sa6), the control section 210 causes the display device 250 to display the message, followed by terminating the present process.

<Product Selection Phase>

When the customer authenticating process is terminated, the customer goes round in the store while pushing the shopping cart SC. Then, when the customer finds a product which attracts his/her attention, he/she points the bar code reader 231 of the customer terminal device 200 at a bar code affixed to the product. The bar code reader 231 reads the bar code affixed to the product, and supplies the data read from the bar code to the control section 210, as bar code information. When receiving the bar code information, the control section 210 adds the customer ID to the bar code information, and sends the bar code information together with the customer ID to the detailed information providing server 300 so as to make an inquiry about the product.

When receiving the request, the control section 310 of the detailed information providing server 300 searches the customer management table TA1 (see FIG. 3) using the customer ID added to the bar code information, as a retrieval key. When a customer ID identical to the customer ID as a retrieval key is found in the customer management table TA1, the control section 310 extracts basic information and priority evaluation information registered in association with the customer ID from the customer management table TA1, and sends the extracted information to the information processing section 350. Then, the control section 310 searches the product management table TA2 (see FIG. 5) using the received bar code information as a retrieval key. When bar code information identical to the bar code information as a retrieval key is found in the product management table TA2, the control section 310 extracts detailed information registered in association with the bar code information from the product management table TA2, and sends the extracted detailed information to the information processing section 350.

Figure 11:
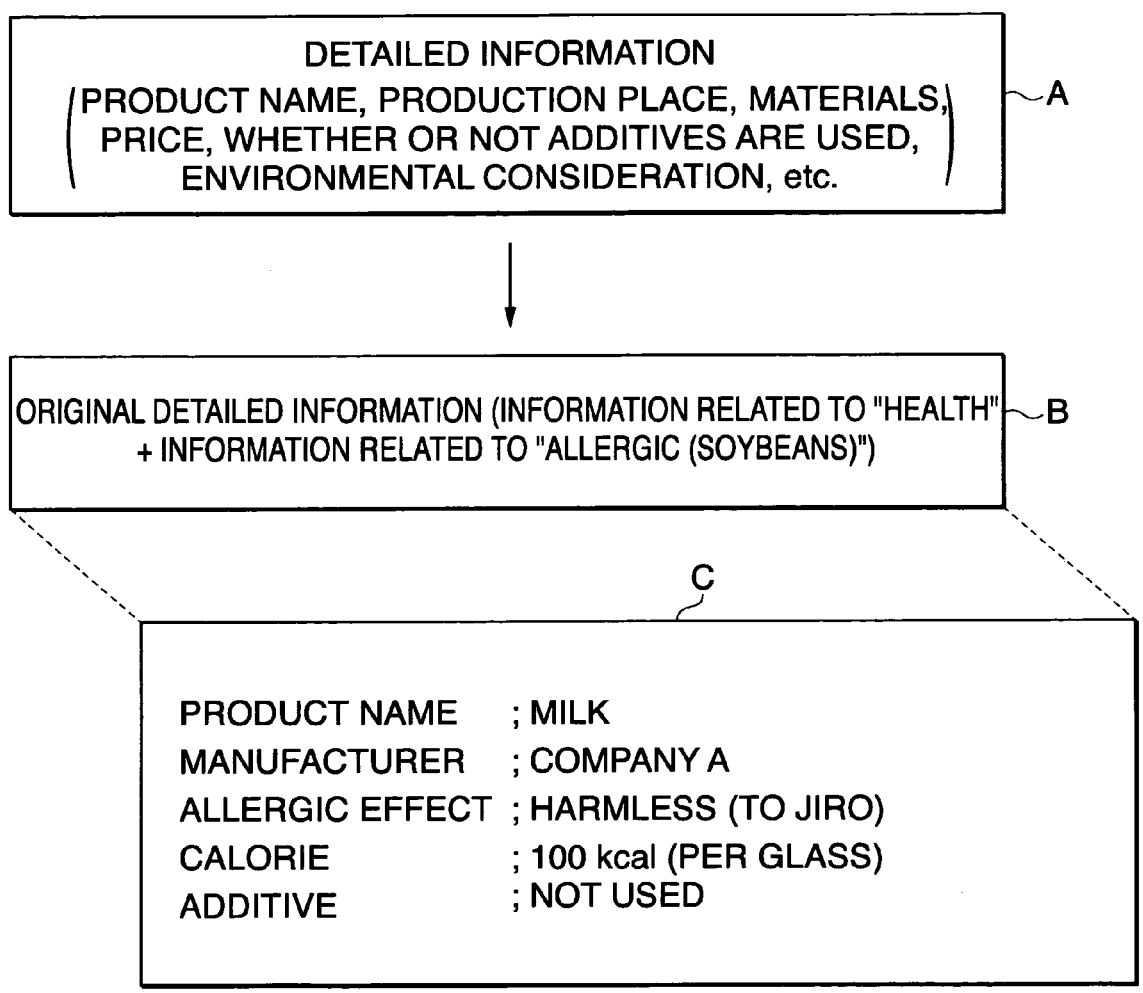
FIG. 11 is a diagram useful in explaining the operation of an information processing section for processing detailed information.

FIG. 11 is a diagram useful in explaining the operation of the information processing section 350 for processing detailed information. In FIG. 11, symbol A designates detailed information before the processing and symbol B designates original detailed information after the processing.

As shown in FIG. 11, the detailed information A before the processing contains all pieces of information indicative of the product name, production place, materials, price, uses, and effects of the product, whether or not additives are used, environmental consideration, and so forth. The information processing section 350 processes the detailed information A as required, based on the customer's basic information and priority evaluation information received from the control section 310. For example, when the "health" is selected as the first priority evaluation item in the priority evaluation information, and "allergic (to soybeans)" is written as a special note, the information processing section 350 extracts only necessary information from the unprocessed detailed information A using the first priority evaluation item and the special note as retrieval keys.

More specifically, pieces of information related to the "health" selected as the first priority evaluation item (e.g. information related to calorie, raw materials, whether or not additives are used, etc.) are extracted from the various kinds of information contained in the detailed information A, and then information related to "allergic (to soybeans)" written as a special note (e.g. information on whether or not an ingredient that aggravates the allergic disease is contained) is extracted. The information processing section 350 thus extracts only the necessary information, and processes the extracted information into the original detailed information B specific to the customer, followed by sending the original detailed information B to the control section 310.

When receiving the original detailed information B, the control section 310 transmits the same to the customer terminal device 200 via the communication section 320. At the same time, the control section 310 records the customer ID of the customer for whom the original detailed information B is provided, and the bar code information on the product associated with the original detailed information B in a predetermined area of the recording section 360 in association with each other. The customer ID and the bar code information recorded in the recording section 360 are sent as product inquiry information to the purchase information creating server 400.

When receiving the original detailed information B from the detailed information providing server 300, the control section 210 of the customer terminal device 200 supplies the same to the display device 250. As a result, a screen an example of which is designated by reference symbol C in FIG. 11 is displayed on the display device 250. By referring to the contents of the screen displayed on the display device 250, the customer determines whether or not the product should be purchased. If the product is one produced in consideration of the health and is not likely to affect the health of an allergic family member (e.g. a child named Jiro) as shown on the screen C, the customer puts the product in the shopping cart SC for purchase. The customer acts similarly when purchasing other products.

FIG. 12A is a view showing an example of a screen displayed on the display device 250 when an inquiry for another product (electrical appliance) is made, while FIG. 12B is a view showing an example of a screen displayed on the display device 250 when an inquiry about still another product (electrical appliance) is made. In this case, it is assumed that "environmental influence" is selected as a priority evaluation item.

As shown in FIG. 12A, the product "CD player (produced by Company C)" is "C-grade" (in the case where the highest grade is A). in terms of environmental consideration as well as in terms of energy saving. A customer who is environment-conscious determines from the contents that the product should not be purchased. Based on this determination, the customer returns the product onto the display rack so as to stop the purchase of the product.

On the other hand, as shown in FIG. 12B, the product "CD player (produced by Company D)" is "A-grade" both in terms of environmental consideration and energy saving, and is certified as an "Eco-Mark product". The customer determines from the contents that the product should be purchased, and puts the product in the shopping cart SC.

<Product Purchase Phase>

The customer who has selected all products that he/she has decided to purchase after making inquiries thereabout, as required, as described above, moves to a place where the accounting apparatus 600 is installed while pushing the shopping cart SC. Then, the customer pays for the products to purchase them all. After the payment and purchase is finished, the accounting apparatus 600 records the customer ID of the customer and the bar code information on the products purchased by the customer in the memory in association with each other. The customer ID and the bar code information recorded in the memory are sent as purchased product information to the purchase information creating server 400.

The control section 410 of the purchase information creating server 400 registers the product inquiry information, as appropriate sent from the detailed information providing server 300, in the inquired product information list R1 (see FIG. 6A). Similarly, the control section 410 registers the purchased product information sent from the accounting apparatus 600 in the purchased product information list R2 (see FIG. 6B), as appropriate. Then, the control section 410 performs comparison between the inquired product information list R1 and the purchased product information list R2 to thereby identify unpurchased products which were not purchased although inquiries thereabout were made, and registers pieces of bar code information associated with the respective unpurchased products and associated customer IDs in the unpurchased product information list R3 (see FIG. 6C).

When a predetermined time period has elapsed, the unpurchased product information list R3 and the purchased product information list R2 are sent from the purchase information creating server 400 to the privilege granting server 500. When receiving the unpurchased product information list R3 and the purchased product information list R2, the privilege granting control section 520 of the privilege granting server 500 converts scores by referring to the privilege granting database 530, and registers the scores in the privilege score storage database 540. The operation of the privilege granting server 500 in the product purchase phase was described in detail in the description of the configuration of the present embodiment, and hence duplicate description thereof is omitted.

As described above, according to the product purchase system 100 of the present embodiment, when detailed information on a product is requested from a customer, original detailed information created by processing the detailed information as appropriate according to the customer's preferences and an environment where the customer lives is offered to the customer.

This enables each customer to promptly and accurately select a product that suits his/her preferences and the like. For example, for a customer who is particular about the health, it is possible to inform the customer how beneficial (or harmful) to the health a product is, and for a customer who is ill and on medication, it is possible to give the customer information on whether or not a product contains a chemical or the like that can produce ill effects.

Each customer can avoid erroneously purchasing a product which he/she does not want by referring to user-specific original detailed information offered by the product purchase system 100. Further, since original detailed information offered to a customer is a part of unprocessed detailed information but not all of the information, it is possible to reduce the amount of information to be offered, in comparison with the case where unprocessed detailed information is offered to a customer without any processing.

Further, the purchase information creating server 400 stores the inquired product information list R1 concerning products detailed information on which was offered to customers, the purchased product information list R2 concerning products actually purchased by customers, and the unpurchased product information list R3 concerning products which were not purchased by customers despite the offer of the detailed information to him/her, so that the use of information in these lists makes it possible to understand what is valued or not valued by each customer in purchasing products (e.g. a fact that a product was not purchased despite its attractive package because the product is produced without any consideration of the environment, or a fact that a product was not purchased because it contains a large amount of additives), and set a clear future course of product development.

Furthermore, the privilege granting server 500 evaluates customers based on items which cannot be rated based on money, in such a manner that a customer who purchased a product produced in consideration of the environment or the health is more highly valued. This enables each customer to objectively compare the customer himself/herself with others in the degree of consideration of the environment or the health. Further, since a customer is rewarded with money for the consideration (i.e. consideration of the environment or the health) if he/she is highly valued, positive actions toward the purchase of products produced in consideration of the environment or the health can be promoted.

Similarly, "intended stop of the purchase of a product" i.e. an act of stopping the purchase of a product because it was judged from detailed information that the product is produced without any consideration of the health or the environment is highly valued, which makes it possible to promote positive actions toward the purchase of products produced in consideration of the health or the environment.

According to the above-described embodiment, absolutely after detailed information on a product is requested by a customer, it is determined whether or not the product was purchased by the customer. However, customers purchase some products without requesting detailed information thereon. In the case of a top-brand product, for example, the brand name (registered trademark or the like) has the function of assuring its quality, and therefore customers loyal to the brand sometimes do not request detailed information thereon. Therefore, it may be determined whether or not a product was purchased without detailed information thereon being requested by a customer. More specifically, the purchase information creating server 400 compares between the product purchase list R2 and the inquired product information list R1 to thereby identify products which are registered in the list R2, but not in the list R1, and then stores the names of the products and so forth in a memory, not shown, of the control section 410 in a list form. By referring to the information stored in the memory, sales persons in each product manufacturer can grasp the degree of credit or reputation embodied by their brand.

The above embodiment given only by way of example, and various changes and modifications may be made without departing from the spirit and scope of the present invention. The following can be envisaged as variations of the above embodiment, for example.

(Variation 1)

Although in the above-described embodiment, the customer terminal device 200 is installed on each shopping cart SC in advance, a wireless communication terminal device (such as a cellular phone, a PHS (Personal Handyphone System: registered trademark) or a PDA (Personal Digital Assistance)) owned by each customer can be used as a customer terminal device, for example. Where a wireless communication terminal device is employed, each customer has only to borrow a bar code reader connectable to the wireless communication terminal device from the store. Further, although in the above-described embodiment, the means for recognizing a customer is implemented by the ID entry buttons 221 provided in the customer recognition section 220, a fingerprint authentication sensor or a voice authentication sensor may be provided in place of (or in addition to) the ID entry buttons 221. In this case, fingerprint information or voice information on each customer is registered in the customer management table TA1 of the detailed information providing server 300. The detailed information providing server 300 compares between the registered fingerprint information or voice information and fingerprint information or voice information sent from the customer terminal device 200, to thereby identify the customer. With this configuration, customer authentication can be performed more accurately.

Further, although in the present embodiment, the means for recognizing a product is implemented by the bar code reader 231 provided in the product recognition section 230, a scanner, an image pickup means, or product number entry buttons may be provided in place of (or in addition to) the bar code reader 231. Where the scanner or the image pickup means is provided, image data or the like of each product is registered in the product management table TA2 of the detailed information providing server 300, and the registered image data and data of an image of a product picked up by the scanner or the image pickup means and sent from the customer terminal device 200 are compared with each other, whereby the product is identified. On the other hand, where the product number entry buttons are provided, the product number of each product is registered in the product management table TA2 in advance, and the registered product numbers and a product number of a product sent from the customer terminal device 200 are compared with each other to thereby identify the product. As described above, the configuration of the customer terminal device 200 may be changed or modified as required.

(Variation 2)

In the above-described embodiment, detailed information is processed based on priority evaluation items ("health" etc.) and a special note ("allergic (to soybeans)" etc.) contained in the priority evaluation information. However, it is to be understood that detailed information may be processed based on basic information on a customer in place of (or in addition to) the priority evaluation items and the special note.

Figure 13:
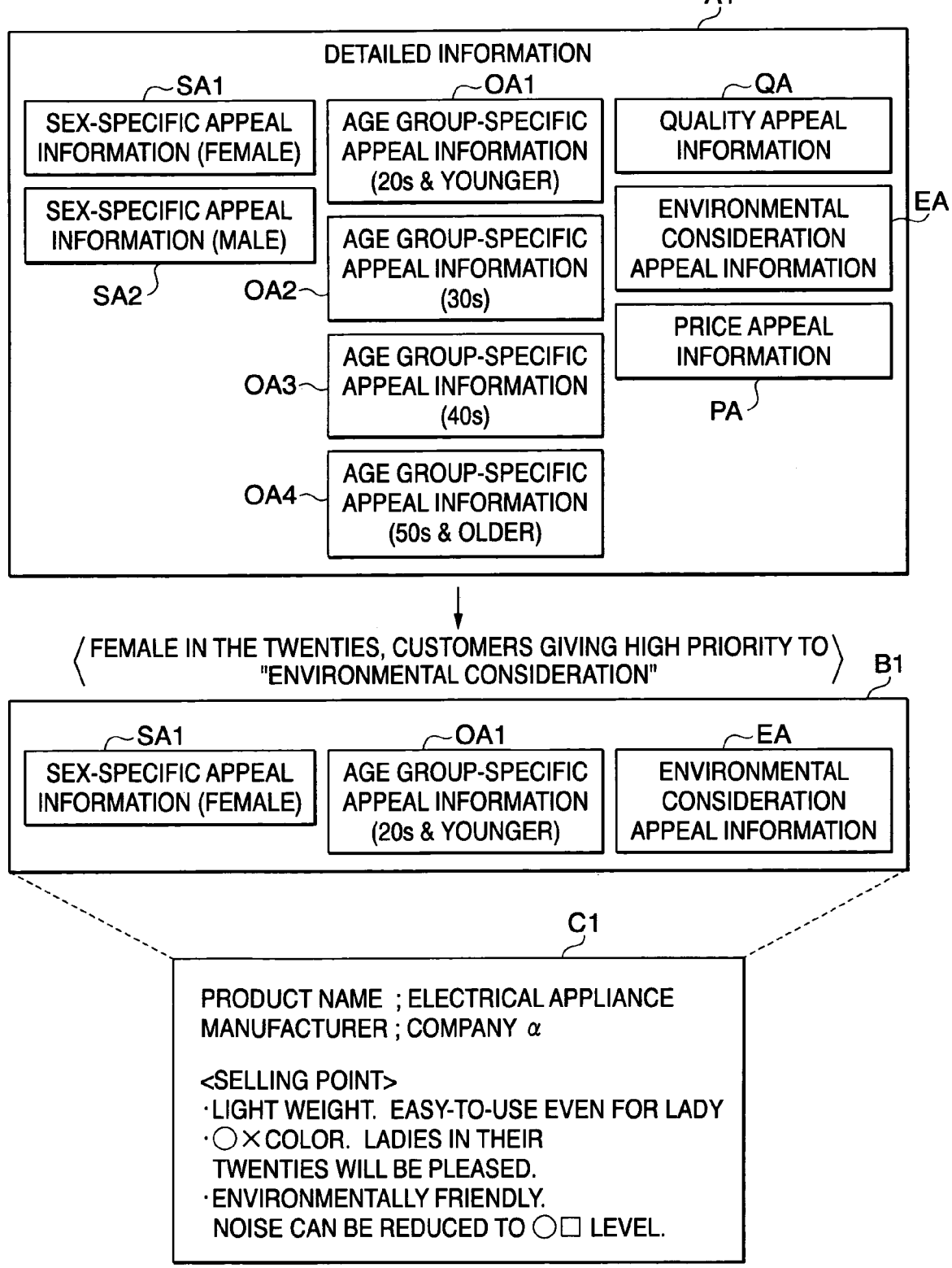
FIG. 13 is a diagram useful in explaining the operation of an information processing section for processing detailed information, according to a variation 2.

FIG. 13 is a diagram useful in explaining the operation of the information processing section 350 for processing detailed information, according to the variation 2. Symbol A1 in FIG. 13 designates detailed information before processing, while symbol B1 in FIG. 13 designates original detailed information after processing. In the following description, it is assumed that the detailed information is on an electrical appliance.

As shown in FIG. 13, the detailed information A1 before processing consists of sex-specific appeal information SA, age group-specific appeal information OA, quality appeal information QA, environmental consideration appeal information EA, and price appeal information PA.

The sex-specific appeal information SA is for prompting customers divided by sex to purchase products. The sex-specific appeal information SA consists of sex-specific appeal information SA1 for prompting female customers to purchase products and sex-specific appeal information SA2 for prompting male customers to purchase products. The age group-specific appeal information OA consists of age group-specific appeal information OA1 for prompting customers in or below the twenties to purchase products, age group-specific appeal information OA2 for prompting customers in the thirties to purchase products, age group-specific appeal information OA3 for prompting customers in the forties to purchase products, and age group-specific appeal information OA4 for prompting customers in or above the fifties to purchase products. The quality appeal information QA, the environmental consideration appeal information EA, and the price appeal information PA are provided to arouse interests of customers in qualities, environmental consideration, and prices, respectively, to urge the customers to purchase products.

The information processing section 350 extracts necessary information based on basic information and priority evaluation information supplied from the control section 310. For example, when the basic information contains pieces of information indicating that a customer is "25 years old" and "female", and the priority evaluation information contains a priority evaluation item indicative of "environmental influence", the information processing section 350 uses these elements as keywords to extract corresponding information from unprocessed detailed information. More specifically, the information processing section 350 extracts the sex-specific appeal information SA1 as information corresponding to the keyword "female", the age group-specific appeal information OA1 as information corresponding to the keyword "25 years old", and the environmental consideration appeal information EA as information corresponding to the keyword. "environmental influence".

After having thus extracted only necessary information, the information processing section 350 processes the extracted information into original detailed information B1 specific to the customer, and sends the original detailed information B1 to the customer terminal device 200 via the control section 310. As a result, a screen C1 an example of which is shown in FIG. 13 is displayed on the display device 250 of the customer terminal device 200. Operations carried out thereafter are similar to those in the above-described embodiment, and hence description thereof is omitted. As described above, detailed information may be processed in consideration of not only priority evaluation information but also a customer's basic information. Of course, detailed information of the present variation (i.e. detailed information consisting of various kinds of appeal information) may be applied to the above-described embodiment. In this case, detailed information may be processed in consideration of a customer's priority evaluation information (e.g. "health") alone, or alternatively detailed information may be processed in consideration of a customer's basic information (e.g. "age") alone.

(Variation 3)

Although in the above-described embodiment, the detailed information providing server 300 provides original detailed information in response to a customer's inquiry about a product, original detailed information tailored for the customer may be provided before the inquiry about the product is made.

More specifically, when a customer ID entered in the customer terminal device 200 is sent therefrom to the detailed information providing server 300, first, the control section 310 of the detailed information providing server 300 refers to the customer management table TA1 to identify a customer ID identical to the customer ID sent from the customer terminal device 200. Then, the control section 310 extracts basic information and priority evaluation information stored in association with the identical customer ID.

When the extracted priority evaluation information contains a priority evaluation item indicative of "health", for example, the control section 310 searches the product management table TA2 using the keyword "health" as a retrieval key, to thereby identify products that match "health". Then, the control section 310 extracts the product names of top five products most appealing to customers' preference for "health" (i.e. most careful of "health") from the product management table TA2, and processes the extracted information as appropriate, followed by sending the processed information as original detailed information to the customer terminal device 200. The top five products most appealing to customers' preference for "health" may be determined in advance e.g. by a storekeeper, and the way of selecting the products can be changed as required. When receiving the original detailed information, the customer terminal device 200 displays this on the display device 250 (see FIG. 14A). By checking contents displayed on the display device 250, the customer can grasp products that suit his/her preferences or the like, in advance (i.e. before going around in the store).

For another example, when the priority evaluation information extracted as above contains the special note indicative of "allergic (to soybeans)", the control section 310 searches the product management table TA2 using the keyword "allergic (to soybeans)" as a retrieval key, to thereby identify products that match the item "allergic (to soybeans)". The control section 310 extracts product names (e.g. "cocoa") of the products each of which contains a material that can affect an "allergic (to soybeans)" person from the product management table TA2, and processes the extracted information as required, followed by sending the processed information as original detailed information to the customer terminal device 200. When receiving the original detailed information, the customer terminal device 200 displays this on the display device 250 (see FIG. 14B). By checking contents displayed on the display device 250, the customer can grasp products that should not be purchased, in advance (i.e. before examining the purchase of the products).

As described above, original detailed information tailored for a customer may be provided before an inquiry about a product is made by the customer.

(Variation 4)

Figure 15:
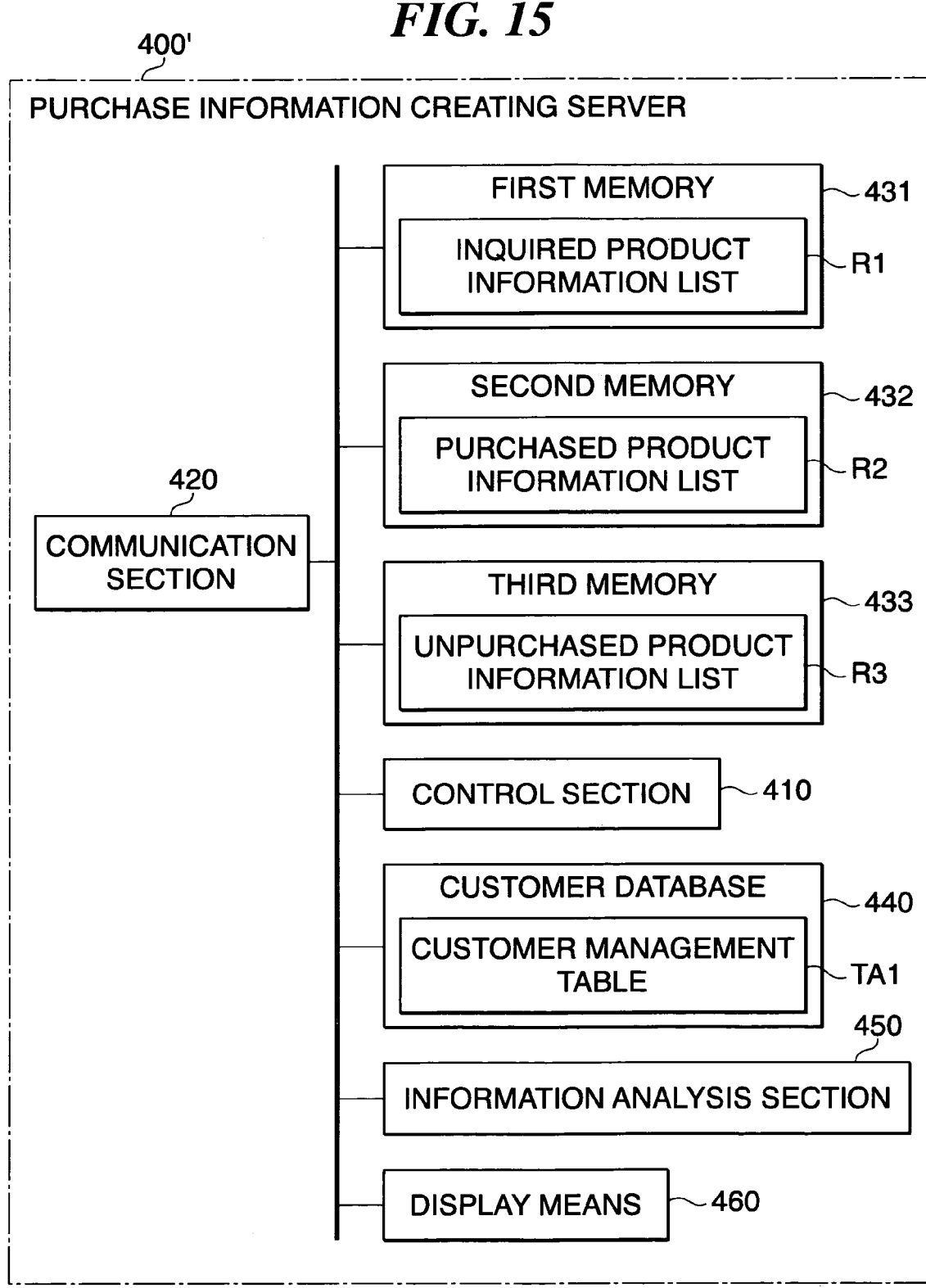
FIG. 15 is a diagram showing the configuration of a purchase information creating server according to a variation 4.

FIG. 15 is a diagram showing the configuration of a purchase information creating server 400' according to the variation 4.

The configuration of the purchase information creating server 400' is basically the same as that of the purchase information creating server 400 appearing in FIG. 1B except that a customer management database 440, an information analysis section 450, and a display means 460 are provided. Therefore, components and sections corresponding to those appearing in FIGS. 1A and 1B are designated by identical reference numerals, and detailed description thereof is omitted.

The customer management database 440 is the same as the customer management database 330 provided in the detailed information providing server 300, and stores the customer management table TA1.

The display means 460 is implemented e.g. by a liquid crystal panel. The display means 460 displays results of analysis by the information analysis section 450 e.g. in graphs.

The information analysis section 450 is for making an analysis of unpurchased products whose bar code information is registered in the unpurchased product information list R3, so as to determine the type of customers who stopped the purchase of the products. One example of the operation of the information analysis section 450 is as follows.

Figure 16:
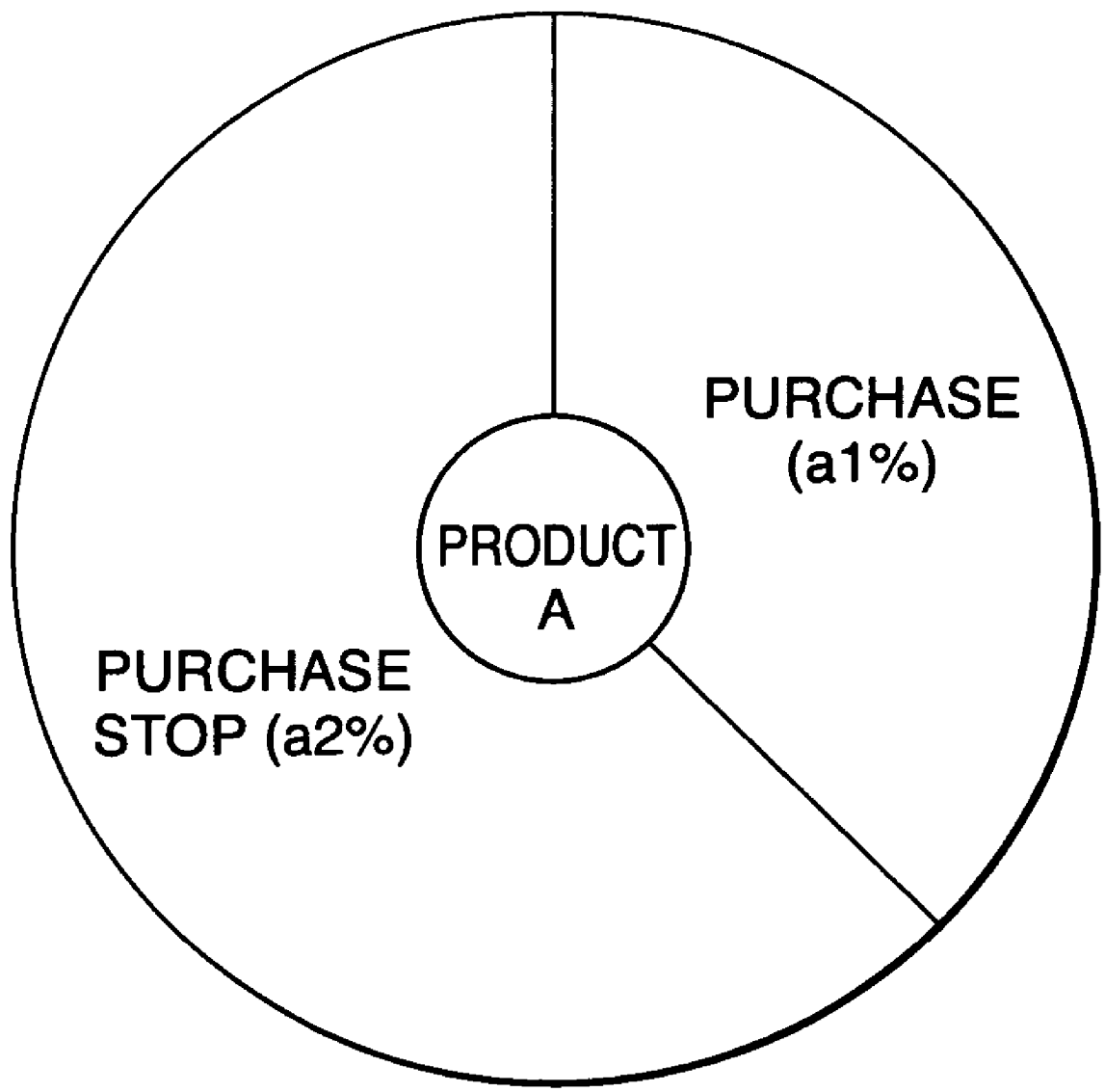
FIG. 16 is a diagram showing an example of a graph displayed on a display device according to the variation 4.

When an instruction for analyzing a product (let it be assumed hereafter that it is the product A) is input via an operating section, not shown, for example, first, the information analysis section 450 identifies the bar code information on the product A. Then, the information analysis section 450 determines the number of pieces of the bar code information registered in the inquired product information list R1 and that of pieces of the bar code information registered in the unpurchased product information list R3, and displays a circular graph showing the ratio between the numbers on the display means 460 (see FIG. 16).

Figure 17A:
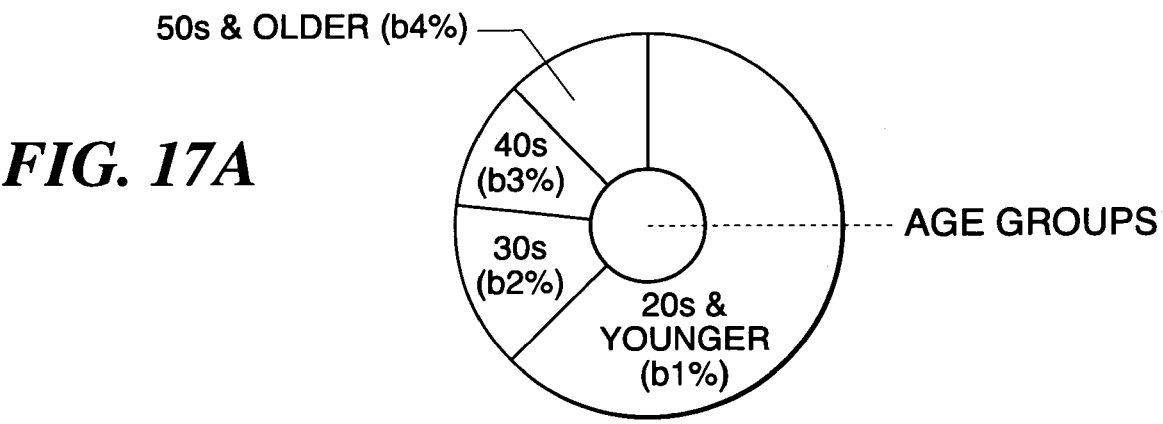
Figure 17B:
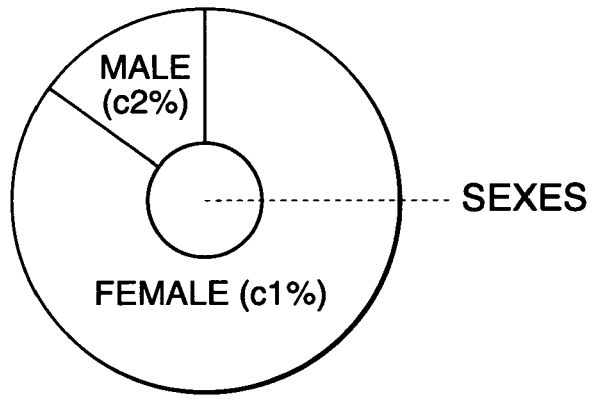
Figure 17C:
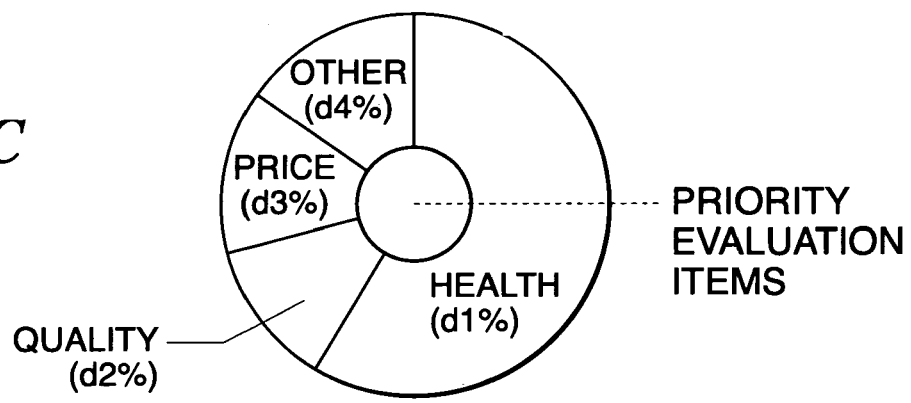
Figure 17D:
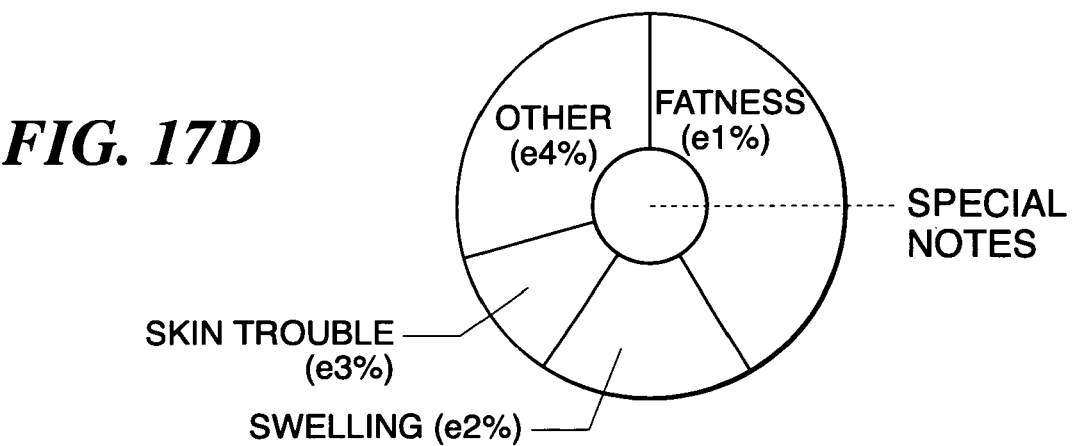

Next, the information analysis section 450 extracts all customer IDs registered in the unpurchased product information list R3 in association with the respective pieces of bar code information. Then, the information analysis section 450 searches the customer database 440 using the extracted customer IDs as retrieval keys, and extracts customers' basic information and priority evaluation information associated with the customer IDs. The information analysis section 450 creates graphs concerning the unpurchased product A, i.e. an age group-based graph (FIG. 17A), a sex-based graph (FIG. 17B), a priority evaluation item-based graph (FIG. 17C), a special note-based graph (FIG. 17D), and so forth, and displays these graphs on the display means 460.

By referring to the graphs displayed on the display means 460, developers and the like in charge of developing the unpurchased product A can determine why the customers did not value the product, which age groups the customers who stopped purchase thereof belong to, and so forth, from many viewpoints. This makes it possible to set a clear future course of product development. Although in the present variations the age group-based graph, the sex-based graph, the priority evaluation item-based graph, and the special note-based graph are created in association with the unpurchased product A, it is to be understood that the same kinds of graphs as these may be created in association with all products about which inquiries were made or all purchased products, and displayed on the display means 450.

Further, the product database 340 storing the product management table TA2 may be installed in the purchase information creating server 400' of the present variation. In this case, the product management table TA2 may be searched using bar code information registered in the unpurchased product information list R3 as a retrieval key, to thereby extract detailed information on unpurchased products, and the extracted detailed information may be displayed on the display means 450.

(Variation 5)

In the above-described embodiment, the detailed information is processed based on a first priority evaluation item contained in the priority evaluation information, but there can be cases where the priority evaluation information contains a second priority evaluation item, a third priority evaluation item, and so on. Assuming such cases, a priority evaluation item to be selected may be switched according to the number of inquiries having been made such that when an inquiry about a product is made for the first time, original detailed information created by processing detailed information based on the first priority evaluation item is offered, and when an inquiry about the same product is made again, original detailed information created by processing detailed information based on the second priority evaluation item is offered. Alternatively, instead of being selected according to the number of inquiries having been made, one of the priority evaluation items may be designated by a customer utilizing the customer terminal device 200. Of course, the number of priority evaluation items to be selected is not limited to one, but a plurality of priority evaluation items may be selected.

(Variation 6)

Although in the above-described embodiment, the original detailed information is formed by a character message, a voice message or a video message may be used to form the original detailed information.

(Variation 7)

In the above-described embodiment, money is given (or returned) to a customer depending on his/her purchase action, but the present invention can be applied to a case where predetermined gifts are offered to customers.

For example, when a customer's cumulative score shown in the customer's score management table TA5 (see FIG. 8) has exceeded a predetermined score, a predetermined gift is offered to the customer. More specifically, it is possible to offer a CD player to a customer whose cumulative score has exceeded 100 points, a digital camera to a customer whose cumulative score has exceeded 300 points, and a liquid crystal television set to a customer whose cumulative score has exceeded 800 points. In this system, each customer saves points until the number of points reaches a score equivalent to a desired gift (e.g. a digital camera) so as to get the gift. When the gift is given to the customer, the points accumulated so far are cleared, and accumulation of points is restarted from "0". In this way, a desired gift or the like may be given to each customer according to his/her cumulative score.

It should be noted that the functions of the information processing section 350 of the detailed information providing server 300 according to the above described embodiment and variations thereof can be realized using either of software and hardware. When software is used to realize the functions, the software may be supplied to the detailed information providing server 300 using a recording medium (e.g. a CD-ROM) storing the software, or from a server provided with the software via the Internet or the like.

It is to be understood that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the above program has only to realize the functions of the above described embodiment on a computer, and the form of the program may be an object code, a program code executed by an interpreter, or script data supplied to an OS.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

What is claimed is:

1. A product purchase support apparatus connected to at least one customer terminal device, comprising:
    a first database that stores attribute information indicative of attributes of a plurality of customers, on a customer-by-customer basis, the attribute information including priority evaluation information indicative of priority evaluation items therein;
    a second database that stores detailed information on each of a plurality of products;
    a receiving device that receives customer identification information for identifying a customer, and product identification information for identifying a product detailed information on which is requested by the customer terminal device, from the customer terminal device;
    a first identification device that identifies attribute information on the customer associated with the customer identification information from the attribute information on the customers stored in said first database;
    a second identification device that identifies detailed information on the product associated with the product identification information from the detailed information on the products stored in said second database;
    an extracting and processing device that extracts only information related to the priority evaluation information included in the attribute information identified by said first identification device, using the priority evaluation information as retrieval keys, from the detailed information on the product identified by said second identification device, and processes the extracted information;
    a first transmitting device that transmits the processed information as original detailed information to the customer terminal device;
    a storage device that stores the customer identification information of the customer for whom the original detailed information is provided and the product identification information on the product associated with the original detailed information, in association with each other; and
    a second transmitting device that transmits the customer identification information and the product identification information stored in association with each other to an information creating apparatus that uses the customer identification information and the product identification information as product inquiry information.

2. A product purchase support apparatus as claimed in claim 1, wherein:
    the attribute information contains priority evaluation information indicative of at least one item given a higher priority in evaluation of a product by each customer when the customer purchases the product, and
    said extracting and processing device extracts information related to the priority evaluation information contained in the attribute information identified by said first identification device from the detailed information on the product identified by said second identification device, and processes the extracted information.

3. A product purchase support apparatus as claimed in claim 1, wherein:
    the attribute information contains basic information indicative of at least one of a customer's sex, and age, and said extracting and processing device extracts information related to the basic information contained in the attribute information identified by said first identification device from the detailed information on the product identified by said second identification device, and processes the extracted information.

4. A product purchase support apparatus connected to at least one customer terminal device, comprising:
  a first database that stores attribute information indicative of attributes of a plurality of customers, on a customer-by-customer basis, the attribute information including priority evaluation information indicative of priority evaluation items therein;
  a second database that stores detailed information on each of a plurality of products;
  a receiving device that receives customer identification information for identifying a customer from the customer terminal device;
  an identification device that identifies attribute information on the customer associated with the customer identification information from the attribute information on the customers stored in said first database;
  an extracting and processing device that extracts only information on a product matching the priority evaluation information included in the attribute information on the customer identified by said identification device, using the priority evaluation information as retrieval keys, from said second database, and processes the extracted information;
  a first transmitting device that transmits the processed information as original detailed information to the customer terminal device;
  a storage device that stores the customer identification information of the customer for whom the original detailed information is provided and the product identification information on the product associated with the original detailed information, in association with each other; and
  a second transmitting device that transmits the customer identification information and the product identification information stored in association with each other to an information creating apparatus that uses the customer identification information and the product identification information as product inquiry information.

5. An information creating apparatus connected to a product purchase support apparatus that transmits detailed information on each product requested by at least one customer terminal device to the customer terminal device, and an accounting apparatus that performs accounting operations on purchased products, comprising:
  a first receiving device that receives, as product inquiry information, product identification information for identifying at least one product associated with the detailed information transmitted to the customer terminal device and customer identification information for identifying the customer, in association with each other, from the product purchase support apparatus;
  a second receiving device that receives, as purchased product information, product identification information for identifying at least one product actually purchased by a customer and customer identification information for identifying the customer having actually purchased the product, in association with each other, from the accounting apparatus; and
  a creation device that creates, based on the product inquiry information and the purchased product information, as unpurchased product information, product identification information for identifying at least one product which was not purchased in actuality although a request for detailed information thereon had been made to the product purchase support apparatus and customer identification information for identifying the customer associated with the unpurchased product, in association with each other from the customer terminal device.

6. An information creating apparatus as claimed in claim 5, further comprising a storage device that stores the detailed information on each product, and an extracting device that searches the storage device using the unpurchased product information as a retrieval key, to thereby extract detailed information on the unpurchased product.

7. An information creating apparatus connected to a product purchase support apparatus that transmits detailed information on each product requested by at least one customer terminal device to the customer terminal device, and an accounting apparatus that performs accounting operations on purchased products, comprising:
  a first receiving device that receives, as product inquiry information, product identification information for identifying at least one product associated with the detailed information transmitted to the customer terminal device, and customer identification information for identifying the customer carrying the customer terminal device, in association with each other, from the product purchase support apparatus;
  a second receiving device that receives, as purchased product information, product identification information for identifying at least one product actually purchased by the customer carrying the customer terminal device, and customer identification information for identifying the customer having actually purchased the product, in association with each other, from the accounting apparatus; and
  a creation device that creates, based on information received by said first and second receiving devices, as unpurchased product information, product identification information for identifying at least one unpurchased product which was not purchased in actuality although a request for detailed information thereon had been made to the product purchase support apparatus and customer identification information for identifying the customer associated with the unpurchased product, in association with each other, from the customer terminal device.

8. A privilege granting system including an information creating apparatus connected to a product purchase support apparatus that transmits detailed information on each product requested by at least one customer terminal device to the customer terminal device, and an accounting apparatus that performs accounting operations on purchased products, and a privilege granting apparatus connected to the information creating apparatus,
  wherein said information creating apparatus comprises:
  a first receiving device that receives, as product inquiry information, product identification information for identifying at least one product associated with the detailed information transmitted to the customer terminal device, and customer identification information for identifying the customer carrying the customer terminal device, in association with each other, from the product purchase support apparatus;
  a second receiving device that receives, as purchased product information, product identification information for identifying at least one product actually purchased by the customer carrying the customer terminal device, and customer identification information for identifying the customer carrying the customer terminal device, in association with each other, from the accounting apparatus;

a creation device that creates, based on information received by said first and second receiving devices, as unpurchased product information, product identification information for identifying at least one unpurchased product which was not purchased in actuality although a request for detailed information thereon had been made to the product purchase support apparatus and customer identification information for identifying the customer associated with the unpurchased product, in association with each other, from the customer terminal device; and a transmitting device that transmits the created unpurchased product information to said privilege granting apparatus, and wherein said privilege granting apparatus comprises:

a first storage device that stores pieces of identification information and respective cumulative scores in association with each other, on a customer-by-customer basis;

a second storage device that stores unpurchased products and points to be given in association with each other;

a receiving device that receives the unpurchased product information from said information processing apparatus;

an identification device that searches said first storage device using the identification information on the customer added to the received unpurchased product information, as retrieval keys, to thereby identify a customer to be given points;

a calculating device that searches said second storage device using the unpurchased product indicated by the unpurchased product information, as a retrieval key, to thereby calculate points to be given;

an updating device that updates a cumulative score associated with the customer identified by said identification device, according to the calculated points;

a first point giving device that gives a higher score to a customer who has been more attentive to the health or the environment when purchasing a product; and a second point giving device that gives a higher score to a customer who has stopped the purchase of the product that is less expensive than other produces, but is produced without any consideration of the health or the environment.

9. A machine-readable medium in a product purchase support apparatus that is connected to at least one customer terminal device and includes a first database, and a second database, said machine-readable medium having encoded thereon a machine-readable program code which when executed causes an information processor in the product purchase support apparatus to perform:

a first storage step for storing attribute information indicative of attributes of a plurality of customers, on a customer-by-customer basis, in the first database, the attribute information including priority evaluation information indicative of priority evaluation items therein;

a second storage step for storing detailed information on each of a plurality of products in the second database;

a receiving step for receiving customer identification information for identifying a customer, and product identification information for identifying a product detailed information on which is requested by the customer terminal device, from the customer terminal device;

a first identification step for identifying attribute information on the customer associated with the customer identification information from the attribute information on the customers stored in the first database;

a second identification step for identifying detailed information on the product associated with the product identification information from the detailed information on the products stored in the second database;

an extracting and processing step for extracting only information related to the priority evaluation information included in the attribute information identified by said first identification step, using the priority evaluation information as retrieval keys, from the detailed information on the product identified by said second identification step, and processing the extracted information;

a transmitting step for transmitting the processed information as original detailed information to the customer terminal device;

a storage step that stores the customer identification information of the customer for whom the original detailed information is provided and the product identification information on the product associated with the original detailed information, in association with each other; and a second transmitting step that transmits the customer identification information and the product identification information stored in association with each other to an information creating apparatus that uses the customer identification information and the product identification information as product inquiry information.

10. A machine-readable medium in a product purchase support apparatus that is connected to at least one customer terminal device and includes a first database, and a second database, said machine-readable medium having encoded thereon a machine-readable program code which when executed causes an information processor in the product purchase support apparatus to perform:

a first storage step for storing attribute information indicative of attributes of a plurality of customers, on a customer-by-customer basis, in the first database, the attribute information including priority evaluation information indicative of priority evaluation items therein;

a second storage step for storing detailed information on each of a plurality of products in the second database;

a receiving step for receiving customer identification information for identifying a customer from the customer terminal device;

an identification step for identifying attribute information on the customer associated with the customer identification information from the attribute information on the customers stored in the first database;

an extracting and processing step for extracting only information on a product matching the priority evaluation information included in the attribute information on the customer identified by said identification step, using the priority evaluation information as retrieval keys, from the second database, and processing the extracted information;

a transmitting step for transmitting the processed information as original detailed information to the customer terminal device;

a storage step that stores the customer identification information of the customer for whom the original detailed information is provided and the product identification information on the product associated with the original detailed information, in association with each other; and a second transmitting step that transmits the customer identification information and the product identification information stored in association with each other to an information creating apparatus that uses the customer identification information and the product identification information as product inquiry information.

11. A machine-readable medium in an information creating apparatus connected to a product purchase support apparatus that transmits detailed information on each product requested by at least one customer terminal device to the customer terminal device, and an accounting apparatus that performs accounting operations on purchased products, said machine-readable medium having encoded thereon a machine-readable program code which when executed causes an information processor in the information creating apparatus to perform:

a first receiving step for receiving, as product inquiry information, product identification information for identifying at least one product associated with the detailed information transmitted to the customer terminal device and customer identification information for identifying the customer having actually purchased the product, in association with each other, from the product purchase support apparatus;

a second receiving step for receiving, as purchased product information, product identification information for identifying at least one product actually purchased by customers and customer identification information for identifying the customer having actually purchased the product, in association with each other, from the accounting apparatus;

a creation step for creating, based on the product inquiry information and the purchased product information, as unpurchased product information, product identification information for identifying at least one unpurchased product which was not purchased in actuality although a request for detailed information thereon had been made to the product purchase support apparatus and customer identification information for identifying the customer associated with the unpurchased product, in association with each other from the customer terminal device.

12. A machine-readable medium in an information creating apparatus connected to a product purchase support apparatus that transmits detailed information on each product requested by at least one customer terminal device to the customer terminal device, and an accounting apparatus that performs accounting operations on purchased products, said machine-readable medium having encoded thereon a machine-readable program code which when executed causes an information processor in the product purchase support apparatus to perform:

a first receiving step for receiving, as product inquiry information, product identification information for identifying at least one product associated with the detailed information transmitted to the customer terminal device, and customer identification information for identifying the customer carrying the customer terminal device, in association with each other, from the product purchase support apparatus;

a second receiving step for receiving, as purchased product information, product identification information for identifying at least one product actually purchased by the customer carrying the customer terminal device, and customer identification information for identifying the customer having actually purchased the product, in association with each other, from the accounting apparatus; and a creation step for creating, based on information received by said first and second receiving steps, as unpurchased product information, product identification information for identifying at least one unpurchased product which was not purchased in actuality although a request for detailed information thereon had been made to the product purchase support apparatus and customer identification information for identifying the customer associated with the unpurchased product, in association with each other, from the customer terminal device.

* * * * *